United States Patent
Oberoi et al.

(10) Patent No.: US 12,434,392 B2
(45) Date of Patent: Oct. 7, 2025

(54) END EFFECTOR FOR MANUFACTURING OPERATIONS IN CONFINED SPACES

(71) Applicant: The Boeing Company, Chicago, IL (US)

(72) Inventors: Harinder Singh Oberoi, Snohomish, WA (US); Kevin Marion Barrick, Kingston, WA (US); Yuanxin Charles Hu, Newcastle, WA (US); Melissa A. Johnson, Puyallup, WA (US); Laura Carolyn Foster, Brier, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 17/936,632

(22) Filed: Sep. 29, 2022

(65) Prior Publication Data
US 2024/0109201 A1   Apr. 4, 2024

(51) Int. Cl.
| | | |
|---|---|---|
| B25J 15/00 | (2006.01) | |
| B25J 9/16 | (2006.01) | |
| B25J 17/02 | (2006.01) | |
| B25J 19/00 | (2006.01) | |
| B08B 7/00 | (2006.01) | |
| B64F 5/10 | (2017.01) | |

(52) U.S. Cl.
CPC ......... B25J 15/0019 (2013.01); B25J 9/1697 (2013.01); B25J 15/0066 (2013.01); B25J 17/0216 (2013.01); B25J 19/0075 (2013.01); B08B 7/0042 (2013.01); B64F 5/10 (2017.01)

(58) Field of Classification Search
CPC ..... B25J 11/005; B25J 11/0075; B25J 11/008; B25J 11/00; B25J 19/02–04; B25J 9/003; B25J 9/0045–0075; B25J 9/1623; B23Q 11/08
See application file for complete search history.

(56) References Cited

U.S. PATENT DOCUMENTS

| | | |
|---|---|---|
| 5,410,638 A | 4/1995 | Colgate et al. |
| 6,330,837 B1 | 12/2001 | Charles et al. |
| 6,681,495 B2 | 1/2004 | Masayuk et al. |
| 6,741,912 B2 | 5/2004 | Olesen et al. |
| 9,399,298 B2 | 7/2016 | Kang |

(Continued)

FOREIGN PATENT DOCUMENTS

| | | |
|---|---|---|
| CN | 110450136 A | 11/2019 |
| CN | 110962144 A | 4/2020 |

(Continued)

OTHER PUBLICATIONS

"Sealant Dispensers," Nordson EFD, copyright 2022, Nordson Corporation, accessed Sep. 27, 2022, 1 pages. https://www.nordson.com/en/divisions/efd/fluids/sealant.

(Continued)

Primary Examiner — Tyrone V Hall, Jr.
(74) Attorney, Agent, or Firm — Yee & Associates, P.C.

(57) ABSTRACT

An end effector for confined space manufacturing operations and methods of use are presented. The end effector comprises a pair of kinematic machines connected in series, and an operational head connected to a first platform of a first kinematic machine of the pair of kinematic machines, the operational head configured to perform number of manufacturing operations on a structure.

20 Claims, 21 Drawing Sheets

(56) References Cited

U.S. PATENT DOCUMENTS

| | | |
|---|---|---|
| 9,849,637 B2 | 12/2017 | Pajel et al. |
| 10,306,122 B2 | 5/2019 | Brockway et al. |
| 10,717,095 B2 | 7/2020 | Knott et al. |
| 11,007,637 B2 | 5/2021 | Gunther |
| 11,110,594 B2 | 9/2021 | Oguri et al. |
| 11,185,882 B2 | 11/2021 | Jin |
| 2003/0017032 A1 | 1/2003 | Olesen et al. |
| 2003/0056566 A1 | 3/2003 | Nashiki et al. |
| 2004/0080294 A1* | 4/2004 | Nihei .................. B25J 19/023 318/568.16 |
| 2005/0044700 A1 | 3/2005 | Ghuman et al. |
| 2008/0161829 A1 | 7/2008 | Kang |
| 2010/0180711 A1* | 7/2010 | Kilibarda ............ B25J 15/0483 219/136 |
| 2010/0268249 A1 | 10/2010 | Stuart |
| 2013/0142608 A1 | 6/2013 | Zhang et al. |
| 2013/0185925 A1* | 7/2013 | Sarh .................... B21J 15/105 29/283 |
| 2015/0108685 A1 | 4/2015 | Pajel et al. |
| 2016/0031080 A1 | 2/2016 | Rey et al. |
| 2017/0165844 A1 | 6/2017 | Brockway et al. |
| 2018/0009000 A1* | 1/2018 | Shang ..................... B05D 1/26 |
| 2018/0161801 A1 | 6/2018 | Jin |
| 2019/0160650 A1 | 5/2019 | Oguri et al. |
| 2019/0344293 A1 | 11/2019 | Knott et al. |
| 2020/0114385 A1 | 4/2020 | Matsumoto et al. |
| 2020/0179976 A1 | 6/2020 | Jin |
| 2020/0238324 A1 | 7/2020 | Laurberg et al. |
| 2020/0361079 A1 | 11/2020 | Gunther |

FOREIGN PATENT DOCUMENTS

| | | | |
|---|---|---|---|
| DE | 102004058450 | 6/2006 | |
| DE | 102004058450 A1 | 6/2006 | |
| EP | 1640120 A1 | 3/2006 | |
| EP | 4063025 A1 * | 9/2022 | .......... B01F 13/1055 |
| JP | 2012096337 A | 5/2012 | |
| WO | 2021147267 | 7/2021 | |
| WO | WO-2021147267 A1 * | 7/2021 | ............. A61B 34/30 |
| WO | 2022024296 A1 | 2/2022 | |

OTHER PUBLICATIONS

"4-Axis RV Series Automated Fluid Dispensing Robot," Nordson EFD, copyright 2022, Nordson Corporation, accessed Sep. 27, 22, 2 pages. https://www.nordson.com/en/divisions/efd/products/automated-dispense-systems/4-axis-rv-series-automated-fluid-dispensing-robot.

Drotning et al., "Automation Tools for Flexible Aircraft Maintenance", Sandia Report, SAND2003-3501, Sandia National Laboratories, Nov. 2003, 30 pages.

European Patent Office Extended Search Report, dated Feb. 19, 2024, regarding Application No. EP23194758.1, 11 pages.

* cited by examiner

END EFFECTOR FOR MANUFACTURING OPERATIONS IN CONFINED SPACES

BACKGROUND INFORMATION

1. Field

The present disclosure relates generally to performing manufacturing operations and more specifically to methods and an apparatus for performing manufacturing operations in confined spaces.

2. Background

In manufacturing large structures, manufacturing operations may need to be performed in confined spaces of the structure. A confined space is an area that has restricted access for entry and is not intended for workers to remain for long times. Some confined spaces can present ergonomic concerns.

Therefore, it would be desirable to have a method and apparatus that takes into account at least some of the issues discussed above, as well as other possible issues. For example, it may be desirable to reduce operator time spent within confined spaces.

SUMMARY

An embodiment of the present disclosure provides an end effector for manufacturing operations in a confined space. The end effector comprises a pair of kinematic machines connected in series, and an operational head connected to a first platform of a first kinematic machine of the pair of kinematic machines. The operational head is configured to perform a number of manufacturing operations on a structure.

Another embodiment of the present disclosure provides an end effector for manufacturing operations in a confined space. The end effector comprises a first hexapod, a second hexapod connected to a base of the first hexapod, and an operational head connected to a first platform of the first hexapod.

A further embodiment of the present disclosure provides a method of performing a manufacturing operation on a structure within a confined space. An end effector is moved towards a structure using a robot, the end effector comprising a pair of kinematic machines connected in series and an operational head connected to a first platform of a first kinematic machine of the pair of kinematic machines. The first kinematic machine is actuated to move the operational head relative to the structure. A number of manufacturing operations is performed on the structure using the operational head at least one of while actuating the first kinematic machine to move the operational head or after actuating the first kinematic machine.

A yet further embodiment of the present disclosure provides a method of performing a manufacturing operation on a structure within a confined space. An end effector is moved towards a structure using a robot, the end effector comprising a pair of kinematic machines connected in series and an operational head connected to a first platform of a first kinematic machine of the pair of kinematic machines. At least one of the first kinematic machine or a second kinematic machine of the pair of kinematic machines is actuated to move the operational head in an operational path relative to the structure. A Number of manufacturing operations is performed on the structure using the operational head as the operational head moves along the operational path.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that existing end effectors for usage with robots inside a confined space are limited to single functions due to volumetric spatial restrictions. The illustrative examples recognize and take into account that the spatial restrictions can also limit the sealant cartridges used to a single unit. Limiting a quantity of sealant cartridges limits the sealing area as well as operational time of the end effector inside a confined space. The illustrative examples recognize and take into account that existing end effector designs can also be limited in their movements in the translational and rotation directions due to fixed and rigid members used in their design.

The illustrative examples have solved limitations of conventional end effectors. The illustrative examples provide an operational head configured to perform multiple functions. In some illustrative examples, the multi-function operational head incorporates the functions of cleaning, sealing and inspection.

The illustrative examples provide for carriage of multiple sealant cartridges along with a sealant transfer mechanism. The multiple fluid cartridges allow the illustrative examples to seal greater portions of the structure. The multiple fluid cartridges allow the illustrative examples to seal for longer periods of time.

Confined space applications have movement restrictions for both translation and rotation. The illustrative examples provide a structural concept with adjustable length members attached with ball swivel joints to platforms. The illustrative examples provide translation and rotational movement using the kinematic machines comprising platforms with adjustable length structural members.

Figure 1:
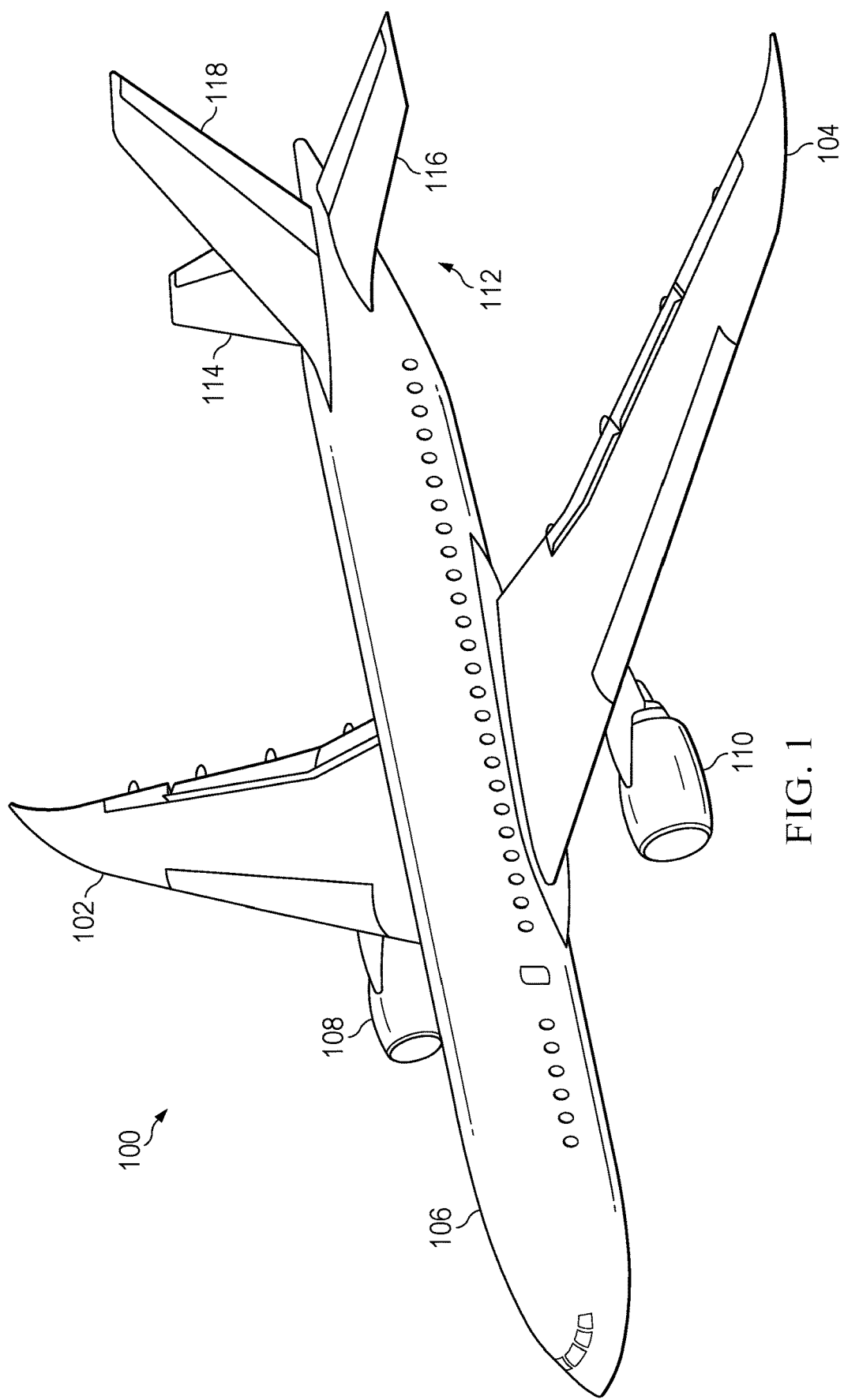
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of a structure that can be manufactured using an end effector for performing manufacturing operations in a confined space. For example, portions of body 106, wing 102, or wing 104 can be manufactured using an end effector for performing manufacturing operations in a confined space as in the illustrative examples.

Figure 2:
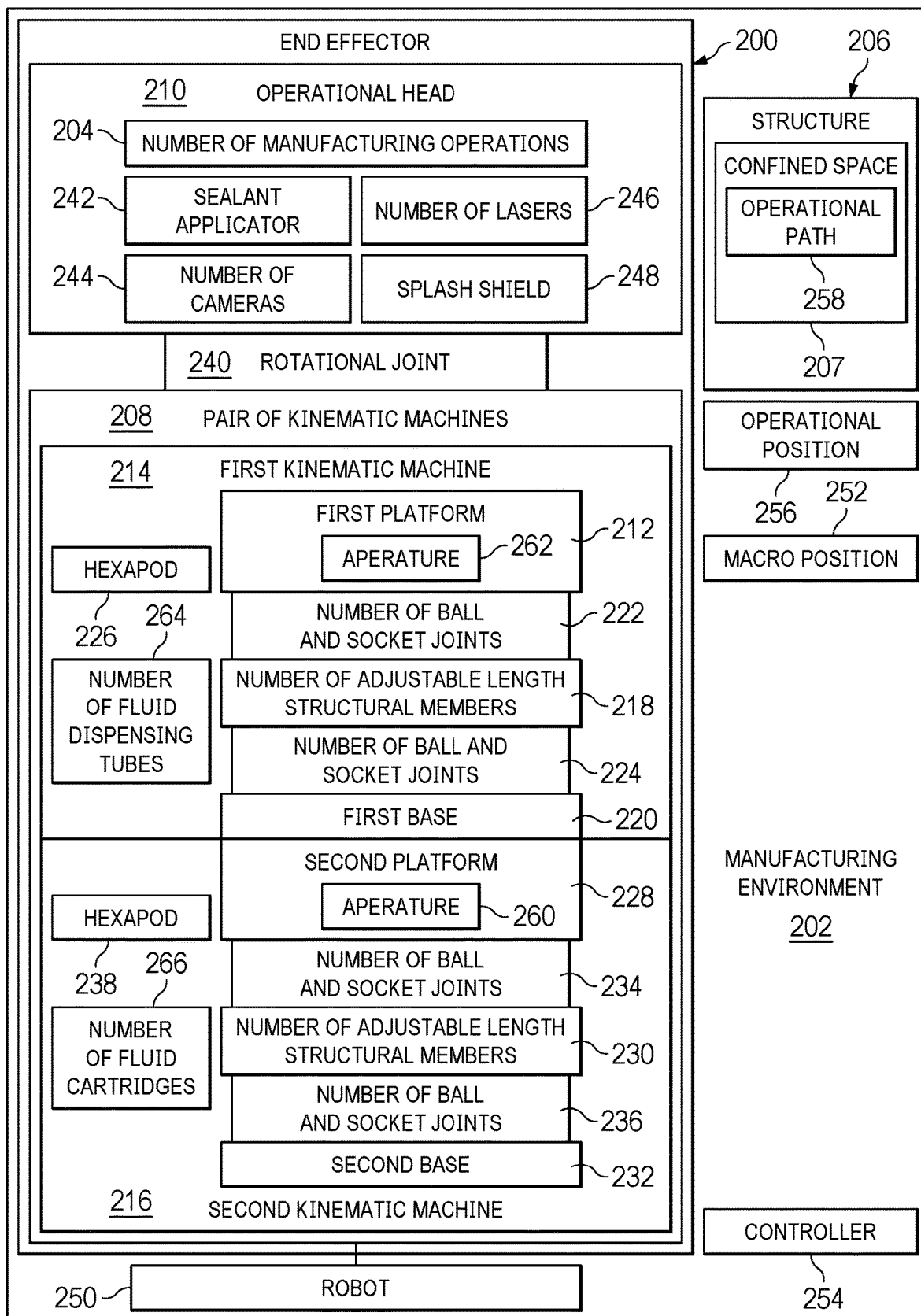
FIG. 2 is an illustration of a block diagram of a manufacturing environment in which an illustrative embodiment may be implemented.

Turning now to FIG. 2, an illustration of a block diagram of a manufacturing environment is depicted in which an illustrative embodiment may be implemented. End effector 200 is utilized in manufacturing environment 202 to perform number of manufacturing operations 204 on structure 206. End effector 200 is configured to perform number of manufacturing operations 204 in confined space 207 of structure 206. End effector 200 comprises pair of kinematic machines 208 connected in series and operational head 210. Operational head 210 is connected to first platform 212 of first kinematic machine 214 of pair of kinematic machines 208. Operational head 210 is configured to perform number of manufacturing operations 204 on structure 206.

Each kinematic machine of pair of kinematic machines 208 comprises a respective platform, a respective base, and a number of adjustable length structural members movably connected to both the respective platform and the respective base. In some illustrative examples, the respective platform of each kinematic machine comprises an aperture.

First kinematic machine 214 comprises first platform 212, first base 220, and number of adjustable length structural members 218 movably connected to both first platform 212 and first base 220. Number of adjustable length structural members 218 is connected to first platform 212 by number of ball and socket joints 222. Number of adjustable length structural members 218 is connected to first base 220 by number of ball and socket joints 224. In some illustrative examples, the platforms and the bases of first kinematic machine 214 and second kinematic machine 216 may be referred to as plates.

In some illustrative examples, pair of kinematic machines 208 comprises at least one hexapod. In some illustrative examples, first kinematic machine 214 comprises hexapod 226.

Second kinematic machine 216 comprises second platform 228, number of adjustable length structural members 230, and second base 232. Number of adjustable length structural members 230 is movably connected to both second platform 228 and second base 232. Number of adjustable length structural members 230 is connected to second platform 228 by number of ball and socket joints 234. Number of adjustable length structural members 230 is connected to second base 232 by number of ball and socket joints 236. In some illustrative examples, second kinematic machine 216 comprises hexapod 238.

Operational head 210 is connected to first kinematic machine 214 by rotational joint 240. Rotational joint 240 is positioned between operational head 210 and first platform 212 of first kinematic machine 214. Operational head 210 is configured to rotate relative to pair of kinematic machines 208 to reach portions of structure 206 within confined space 207. Operational head 210 comprises sealant applicator 242 configured to apply a sealant to structure 206. In some illustrative examples, sealant applicator 242 comprises an exchangeable sealant application tip. The exchangeable sealant application tip can be removed and changed for a tip of a different size or design. Sealant applicator 242 takes any desirable form. In some illustrative examples, sealant applicator 242 comprises at least one of a brush, an injection nozzle, or a spray nozzle. In some illustrative examples, sealant applicator 242 is a single use tip. In some illustrative examples, sealant applicator 242 can be cleaned and reused.

In some illustrative examples, operational head 210 further comprises number of cameras 244. Number of cameras 244 is directed away from pair of kinematic machines 208. By being directed away from pair of kinematic machines 208, number of cameras 244 is directed in front of end effector 200. By being directed away from pair of kinematic machines 208, number of cameras 244 can be directed at structure 206. In some illustrative examples, number of cameras 244 is used to position end effector 200 in a desired location relative to structure 206. In some illustrative examples, number of cameras 244 is configured to perform inspection of structure 206. In some illustrative examples, number of cameras 244 is configured to perform inspection of sealant applied to structure 206.

In some illustrative examples, number of cameras 244 of operational head 210 comprises two cameras, each of which can be used together or individually for positional movement measurements and adjustment as well as for inspection of applied sealant quality. In some of these illustrative examples, both of these functions are designed to be provided in process and in real time.

In some illustrative examples, operational head 210 further comprises number of lasers 246. Number of lasers 246 is directed away from pair of kinematic machines 208. By being directed away from pair of kinematic machines 208, number of lasers 246 is directed in front of end effector 200. By being directed away from pair of kinematic machines 208, number of lasers 246 can be directed at structure 206. In some illustrative examples, number of lasers 246 comprises a proximity sensor. In some illustrative examples, number of lasers 246 can be used to clean structure 206. In some illustrative examples, number of lasers 246 comprises a positional locating laser and a pre-application clean/drying laser.

In some illustrative examples, number of lasers 246 comprises two lasers. In these illustrative examples, each of number of lasers 246 can be used together or individually for cleaning of surfaces prior to application as well as post application of sealant. The lasers can also be used individually or together for positional movement measurements and adjustments.

In some illustrative examples, operational head 210 comprises splash shield 248 configured to reduce debris contacting number of cameras 244 as operational head 210 performs number of manufacturing operations 204 on structure 206. In some illustrative examples, operational head 210 comprises splash shield 248 configured to reduce debris contacting number of lasers 246 as operational head 210 performs number of manufacturing operations 204 on structure 206.

A kinematic machine of pair of kinematic machines 208 is connected to robot 250. In this illustrative example, second base 232 is configured to be connected to a robotic system. As depicted, second base 232 is configured to be connected to robot 250. Robot 250 can take any desirable form. In some illustrative examples, robot 250 takes the form of a robotic arm. Robot 250 is used to position end effector 200 in macro position 252 by controller 254. Macro position 252 is an initial position relative to structure 206. Macro position 252 is a position relative to structure 206 such that end effector 200 can perform orientation relative to structure 206.

In some illustrative examples, performing number of manufacturing operations 204 comprises determining operational position 256 of end effector 200 relative to structure 206 using number of lasers 246 of operational head 210. Operational position 256 is a position to begin performing one of number of manufacturing operations 204, such as sealing, inspection, or cleaning. In some illustrative examples, determining operational position 256 of end effector 200 uses at least one of number of lasers 246 or a number of cameras 244 of operational head 210.

In some illustrative examples, at least one manufacturing operation of number of manufacturing operations 204 is performed in a stationary position. In some illustrative examples, at least one manufacturing operation of number of manufacturing operations 204 is performed in operational position 256.

In some illustrative examples, actuating at least one of first kinematic machine 214 or second kinematic machine 216 of pair of kinematic machines 208 to move operational head 210 in operational path 258 relative to structure 206. In some illustrative examples, at least one manufacturing operation of number of manufacturing operations 204 is performed on structure 206 using operational head 210 as operational head 210 moves along operational path 258.

In some illustrative examples, a manufacturing operation of number of manufacturing operations 204 is performed on structure 206 within confined space 207. Operational head 210 of end effector 200 with at least 12 degrees of freedom is positioned relative to structure 206. Number of manufacturing operations 204 is performed on structure 206 using operational head 210 as the operational head 210 moves along operational path 258.

In this illustrative example, the platform of each kinematic machine comprises an aperture. In this illustrative example, second platform 228 of second kinematic machine 216 has aperture 260 and first platform 212 of first kinematic machine 214 has aperture 262. In some illustrative examples, utilities can be directed through aperture 260 and aperture 262.

In this illustrative example, number of fluid dispensing tubes 264 extends through first kinematic machine 214 and through aperture 262 to connect to operational head 210. Number of fluid dispensing tubes 264 supply fluid from number of fluid cartridges 266 to operational head 210. In some illustrative examples, number of fluid cartridges 266 is a number of sealant cartridges. In some illustrative examples, number of fluid cartridges 266 is two fluid cartridges. In some illustrative examples, number of fluid cartridges 266 is three fluid cartridges. Number of fluid cartridges 266 is positioned within at least one of first kinematic machine 214 or second kinematic machine 216 of pair of kinematic machines 208.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, number of fluid cartridges 266 can be present in first kinematic machine 214 instead of second kinematic machine 216. In some illustrative examples, at least one of pair of kinematic machines can take the form of a kinematic machine other than a hexapod.

Figure 3:
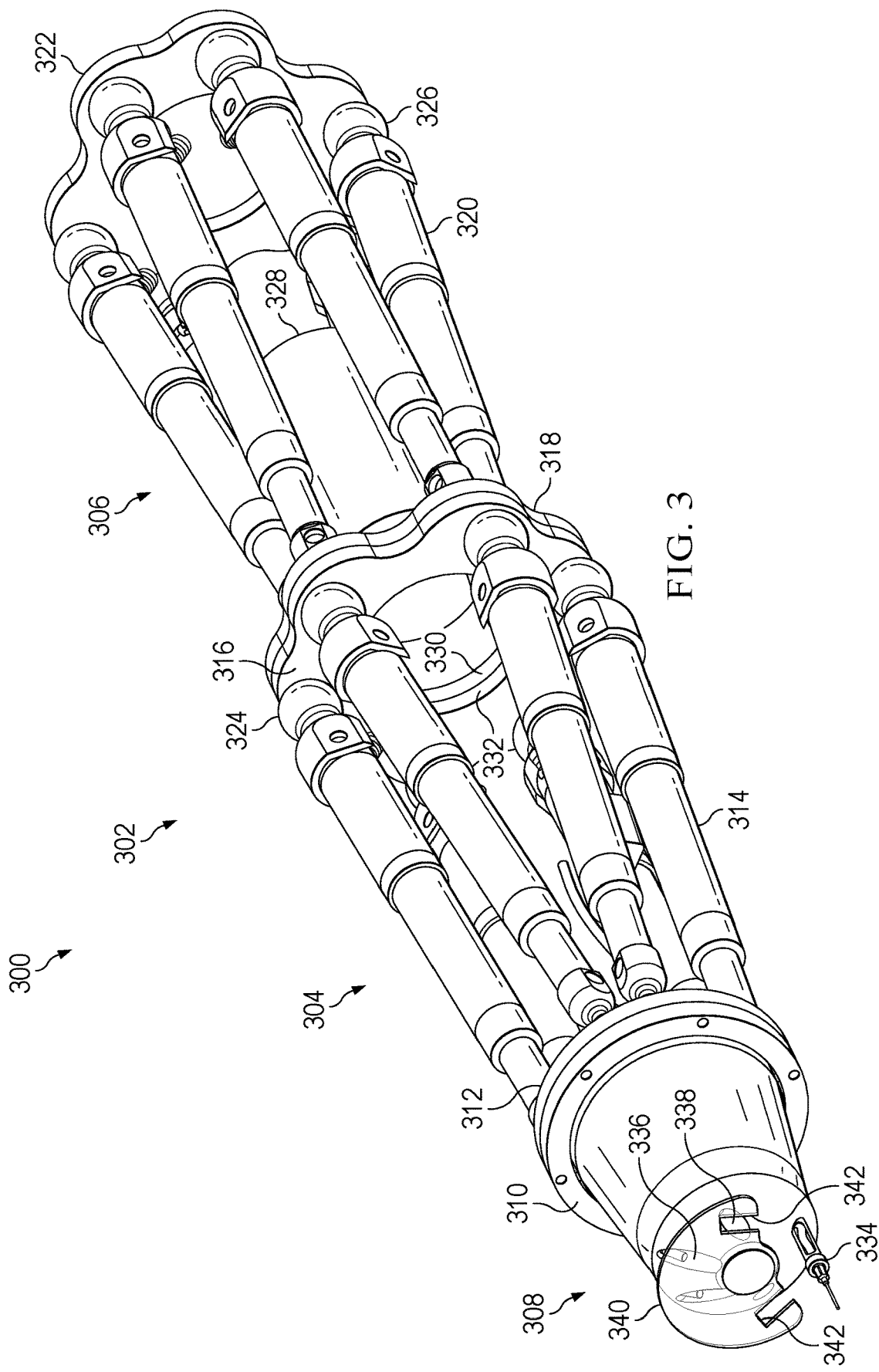
FIG. 3 is an illustration of an isometric view of an end effector for performing manufacturing operations in confined spaces in accordance with an illustrative embodiment.

Turning now to FIG. 3 is an illustration of an isometric view of an end effector for performing manufacturing operations in confined spaces is depicted in accordance with an illustrative embodiment. End effector 300 of FIG. 3 is a physical implementation of end effector 200 of FIG. 2.

End effector 300 is configured for confined space manufacturing operations. End effector 300 comprises pair of kinematic machines 302 connected in series. Pair of kinematic machines 302 comprises first kinematic machine 304 and second kinematic machine 306. Operational head 308 is connected to first kinematic machine 304 of pair of kinematic machines 302. More specifically, operational head 308 comprises rotational joint 310. Rotational joint 310 is connected to first platform 312 of first kinematic machine 304. Operational head 308 is connected to first platform 312 of first kinematic machine 304. Operational head 308 is configured to perform a number of manufacturing operations on a structure.

As depicted, pair of kinematic machines 302 comprises at least one hexapod. As depicted, first kinematic machine 304 and second kinematic machine 306 are hexapods. First kinematic machine 304 comprises first platform 312, number of adjustable length structural members 314, and first base 316. Number of adjustable length structural members 314 connects first platform 312 and first base 316. First base 316 of first kinematic machine 304 is connected to second platform 318 of second kinematic machine 306.

Second kinematic machine 306 comprises second platform 318, number of adjustable length structural members 320, and second base 322. Number of adjustable length structural members 320 connects second platform 318 and second base 322. Second base 322 of second kinematic machine 306 is configured to be connected to a robot.

As depicted, movement of operational head 308 is influenced by movement of number of adjustable length structural members 314 about number of ball and socket joints 324. Additionally, movement of operational head 308 is influenced by movement of number of adjustable length structural members 320 about number of ball and socket joints 326.

End effector 300 further comprises number of fluid cartridges 328 positioned within one of pair of kinematic machines 302. In this illustrative example, number of fluid cartridges 328 is positioned within second kinematic machine 306. As depicted, number of fluid cartridges 328 is positioned within number of adjustable length structural members 320. Number of adjustable length structural members 320 provides sufficient rigidity to protect number of fluid cartridges 328.

Sealant from sealant cartridges reaches operational head 308 through aperture 330 in second platform 318 and aperture 332 in first base 316. Sealant is delivered to sealant applicator 334 of operational head 308 by dispensing tubes (not depicted). The dispensing tubes (not depicted) extend through first kinematic machine 304 to reach operational head 308.

Operational head 308 comprises additional functional components. As depicted, operational head 308 of end effector 300 further comprises number of cameras 336 directed away from pair of kinematic machines 302. As depicted, operational head 308 of end effector 300 further comprises number of lasers 338 directed away from pair of kinematic machines 302.

In this illustrative examples, operational head 308 further comprises splash shield 340 configured to reduce debris contacting at least one of number of cameras 336 or number of lasers 338 as operational head 308 performs the number of manufacturing operations on a structure (not depicted). Splash shield 340 is depicted in phantom for viewing number of cameras 336 and number of lasers 338. In this illustrative example, splash shield 340 comprises slots 342. Slots 342 allow for number of lasers 338 to send energy through slots 342 of splash shield 340.

The illustration of end effector 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although first base 316 and second platform 318 are depicted as separate plates, in some non-depicted illustrative examples, first base 316 and second platform 318 can be formed of a single plate. In these illustrative examples, the single plate forms a portion of both first kinematic machine 304 and second kinematic machine 306.

In some non-depicted examples, slots 342 are not present. In some illustrative examples, the size and position of splash shield 340 are configured to reduce debris contacting number of cameras 336 but to stop prior to number of lasers 338. In some illustrative examples, splash shield 340 is moveable. In some illustrative examples, splash shield 340 is at least one of retractable or rotatable to allow for splash shield 340 to move prior to operation of at least one of number of cameras 336 or number of lasers 338

Figure 4:
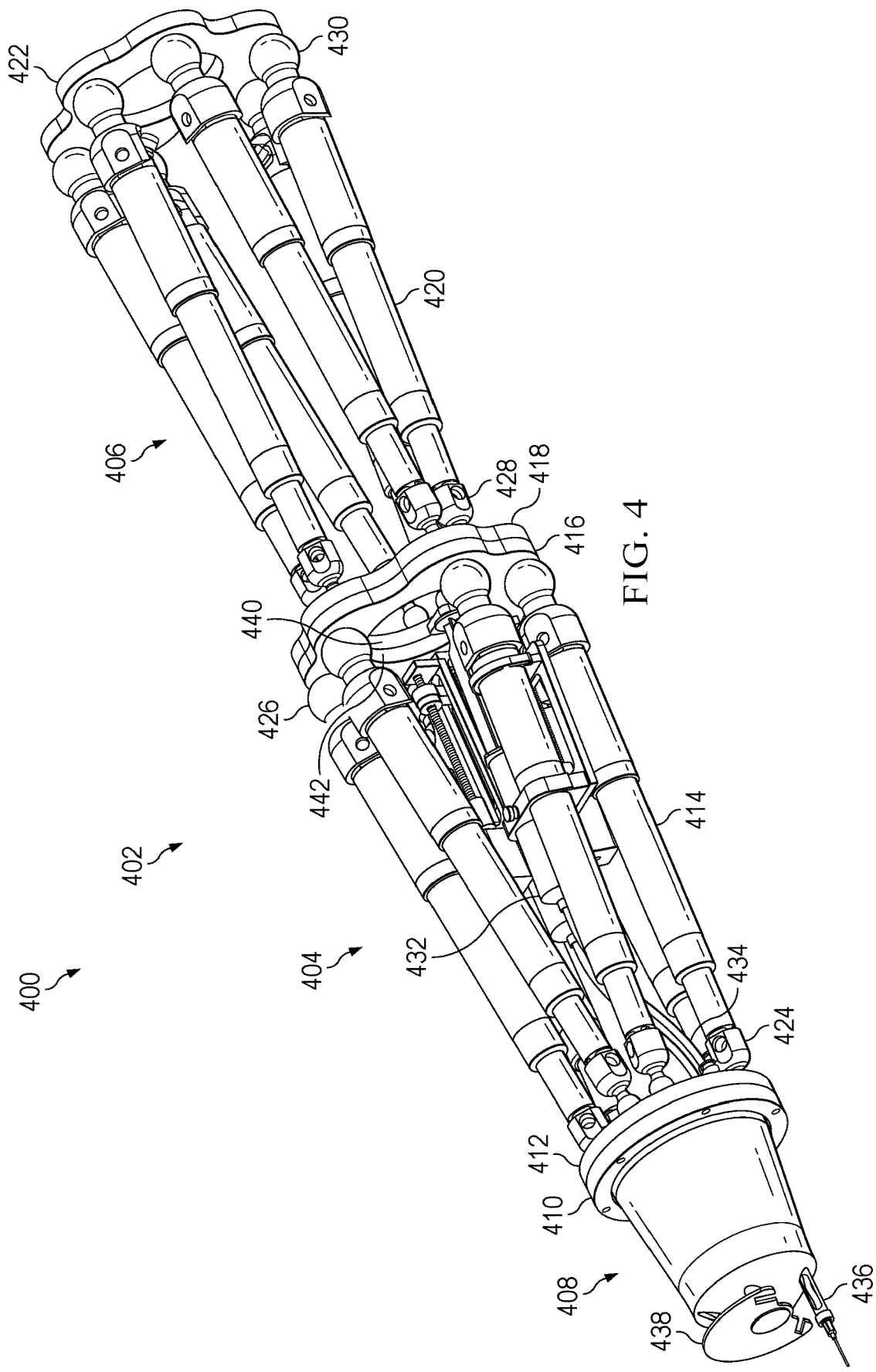
FIG. 4 is an illustration of an isometric view of an end effector for performing manufacturing operations in confined spaces in accordance with an illustrative embodiment.

Turning now to FIG. 4 is an illustration of an isometric view of an end effector for performing manufacturing operations in confined spaces is depicted in accordance with an illustrative embodiment. End effector 400 of FIG. 4 is a physical implementation of end effector 200 of FIG. 2.

End effector 400 is configured for confined space manufacturing operations. End effector 400 comprises pair of kinematic machines 402 connected in series. Pair of kinematic machines 402 comprises first kinematic machine 404 and second kinematic machine 406. Operational head 408 is connected to first kinematic machine 404 of pair of kinematic machines 402. More specifically, operational head 408 comprises rotational joint 410. Rotational joint 410 is connected to first platform 412 of first kinematic machine 404. Operational head 408 is connected to first platform 412 of first kinematic machine 404. Operational head 408 is configured to perform a number of manufacturing operations on a structure.

As depicted, pair of kinematic machines 402 comprises at least one hexapod. As depicted, first kinematic machine 404 and second kinematic machine 406 are hexapods. First kinematic machine 404 comprises first platform 412, number of adjustable length structural members 414, and first base 416. Number of adjustable length structural members 414 connect first platform 412 and first base 416. First base 416 of first kinematic machine 404 is connected to second platform 418 of second kinematic machine 406.

Second kinematic machine 406 comprises second platform 418, number of adjustable length structural members 420, and second base 422. Number of adjustable length structural members 420 connect second platform 418 and second base 422. Second base 422 of second kinematic machine 406 is configured to be connected to a robot.

As depicted, movement of operational head 408 is influenced by movement of number of adjustable length structural members 414 using number of ball and socket joints 424 and number of ball and socket joints 426. Additionally, movement of operational head 408 is influenced by movement of number of adjustable length structural members 420 using number of ball and socket joints 428 and number of ball and socket joints 430.

End effector 400 further comprises number of fluid cartridges 432 positioned within one of pair of kinematic machines 402. In this illustrative example, number of fluid cartridges 432 is positioned within first kinematic machine 404. As depicted, number of fluid cartridges 432 is positioned within number of adjustable length structural members 414. Number of adjustable length structural members 414 provides sufficient rigidity to protect number of fluid cartridges 432.

Fluid, such as a sealant, from number of fluid cartridges 432 reaches operational head 408 through aperture 440 in second platform 418 and aperture 442 in first base 416. Sealant is delivered to sealant applicator 436 of operational head 408 by dispensing tubes 434. The dispensing tubes 434 extend through first kinematic machine 404 to reach operational head 408.

Figure 5:
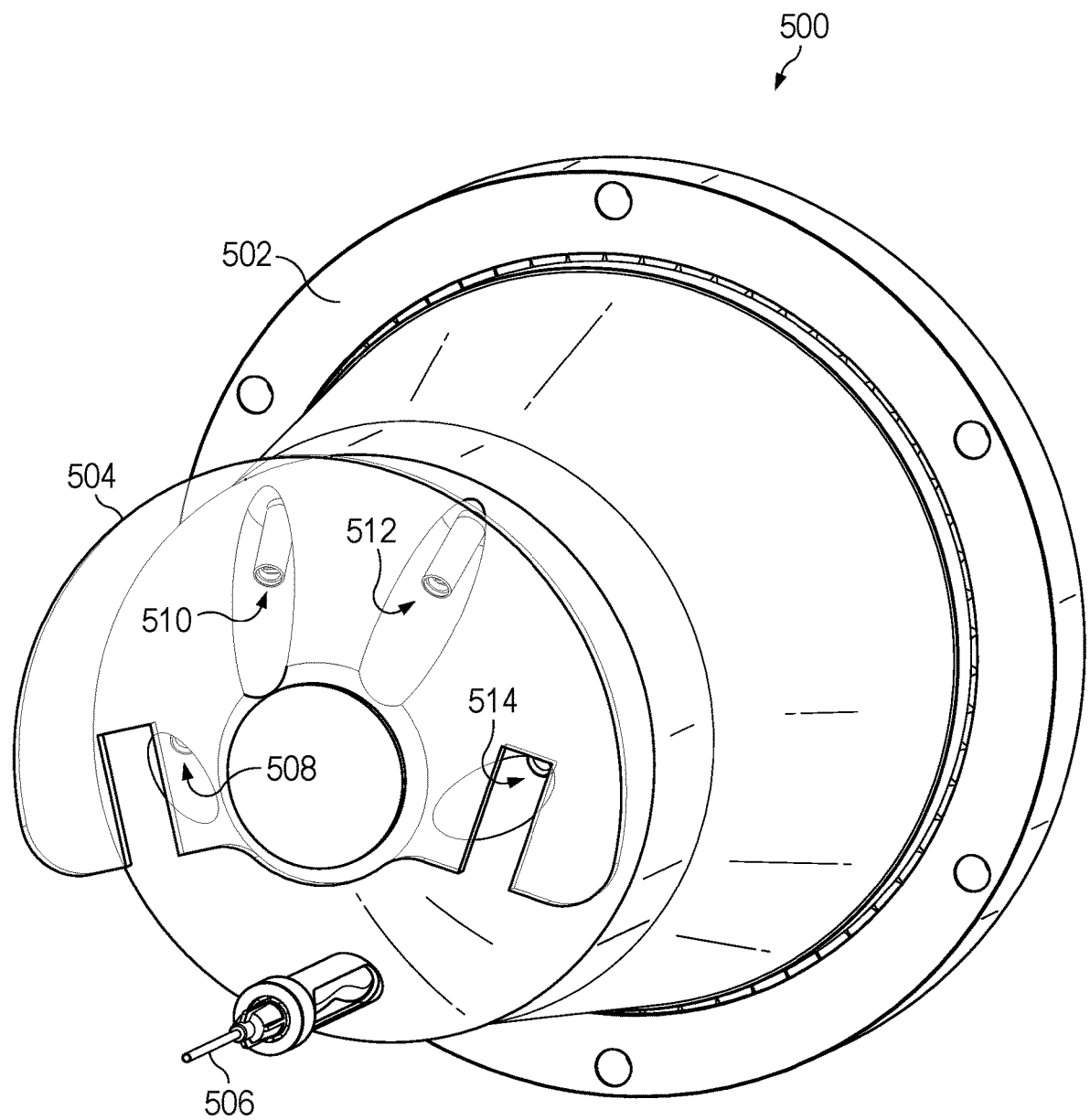
FIG. 5 is an illustration of an isometric view of an operational head of an end effector in accordance with an illustrative embodiment.

Turning now to FIG. 5 is an illustration of an isometric view of an operational head of an end effector is depicted in accordance with an illustrative embodiment. Operational head 500 is a physical implementation of operational head 210 of FIG. 2. In some illustrative examples, operational head 500 is the same as operational head 308 of FIG. 3. In some illustrative examples, operational head 500 is the same as operational head 408 of FIG. 4.

Operational head 500 comprises rotational joint 502. Rotational joint 502 is configured to connect to a platform of a kinematic machine. Rotational joint 502 enables rotation of operational head 500 relative to a pair of kinematic machines in an end effector. Operational head 500 further comprises splash shield 504 and sealant applicator 506. In some illustrative examples, splash shield 504 protects components from splash back of sealant from sealant applicator 506. In some illustrative examples, splash shield 504 protects components from debris during cleaning of a structure.

As depicted, operational head 500 further comprises laser 508, camera 510, camera 512, and laser 514. In some illustrative examples, at least one of camera 510 or camera 512 is configured to perform mapping of a structure. In some illustrative examples, at least one of camera 510 or camera 512 is used to position the end effector in a desired location relative to a structure. In some illustrative examples, at least one of camera 510 or camera 512 is configured to perform inspection of a structure.

In some illustrative examples, at least one of laser 508 or laser 514 is used as a proximity sensor. In some illustrative examples, at least one of laser 508 or laser 514 is used to clean a structure.

Figure 6:
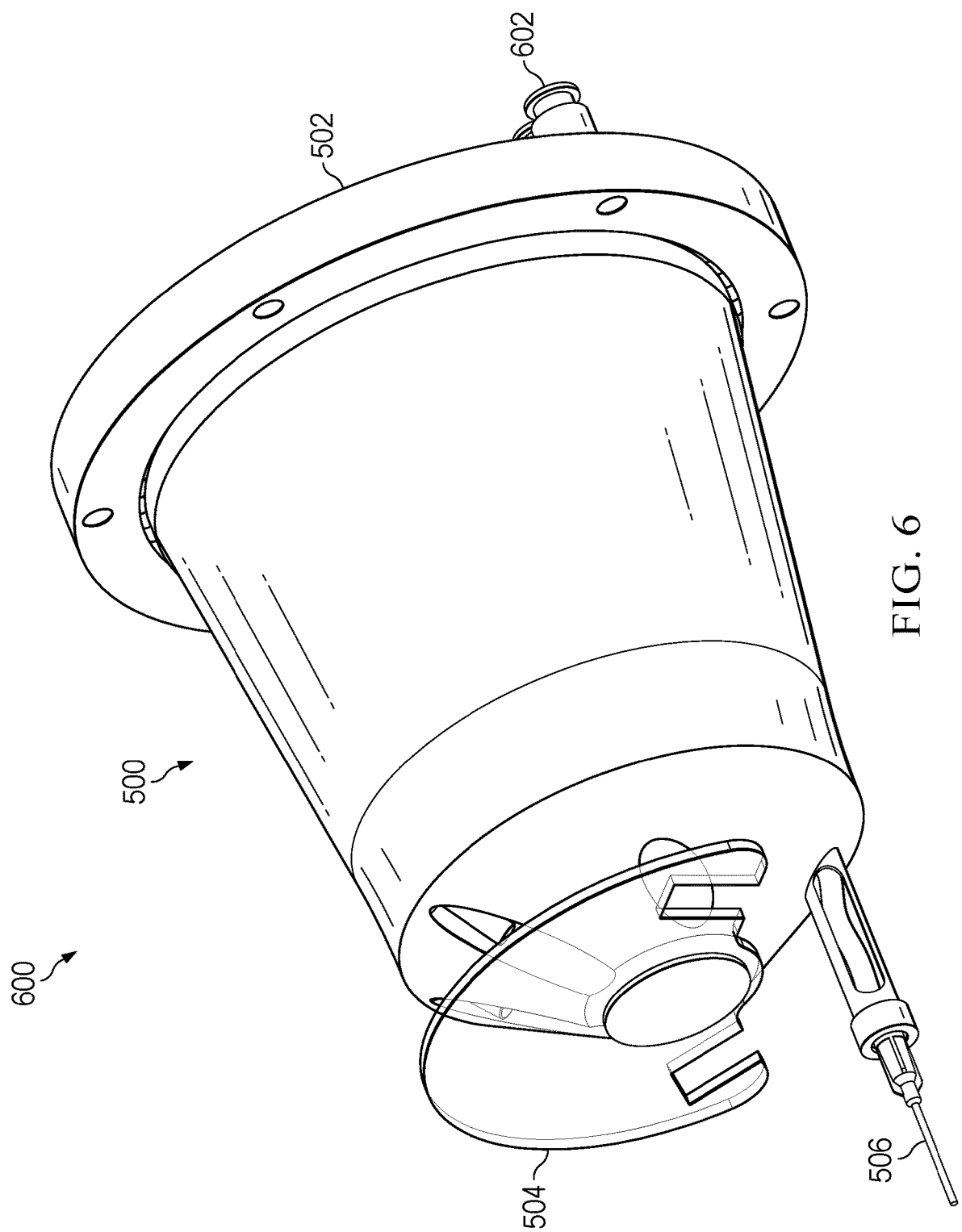
FIG. 6 is an illustration of an isometric view of an operational head of an end effector in accordance with an illustrative embodiment.

Turning now to FIG. 6 is an illustration of an isometric view of an operational head of an end effector is depicted in accordance with an illustrative embodiment. In view 600 of operational head 500, splash shield 504 is opaque. In view 600 of operational head 500, connectors 602 are visible. Connectors 602 are configured to receive utilities for performance of manufacturing operations by operational head 500. In some illustrative examples, connectors 602 are configured to receive at least one of sealant, power, or data.

Figure 7:
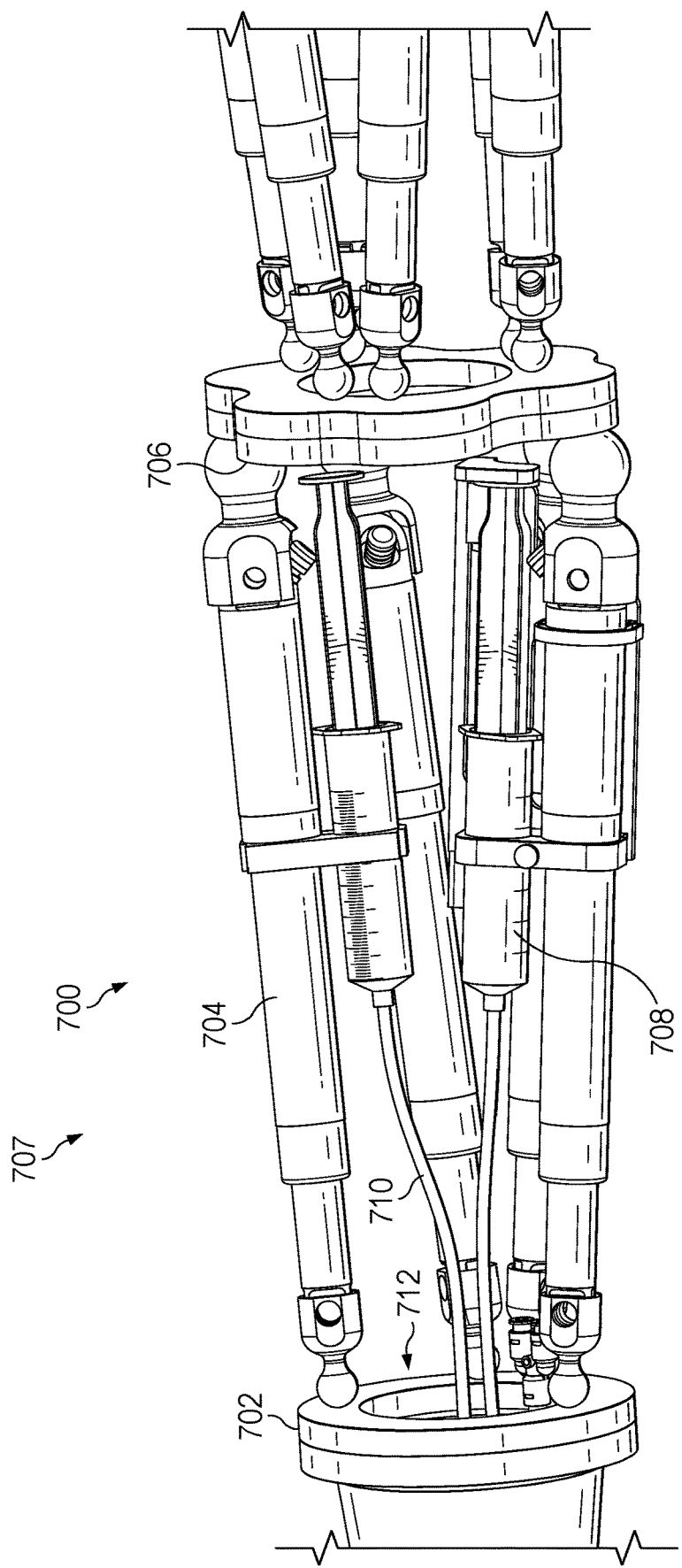
FIG. 7 is an illustration of a side isometric view of a first kinematic machine of an end effector in accordance with an illustrative embodiment.

Turning now to FIG. 7 is an illustration of a side isometric view of a first kinematic machine of an end effector is depicted in accordance with an illustrative embodiment. Kinematic machine 700 is a physical implementation of one of pair of kinematic machines 208 of FIG. 2. In some illustrative examples, kinematic machine 700 is the same as first kinematic machine 404 of FIG. 4.

Kinematic machine 700, comprises platform 702, number of adjustable length structural members 704, and base 706. In view 707 some of number of adjustable length structural members 704 have been removed for better visualizing number of fluid cartridges 708 and dispensing tubes 710. As depicted, dispensing tubes 710 extend through aperture 712 of platform 702. As depicted, kinematic machine 700 is a physical implementation of first kinematic machine 214 of FIG. 2. Platform 702 is configured to connect to an operational head, such as operational head 500 of FIGS. 5-6.

Figure 8:
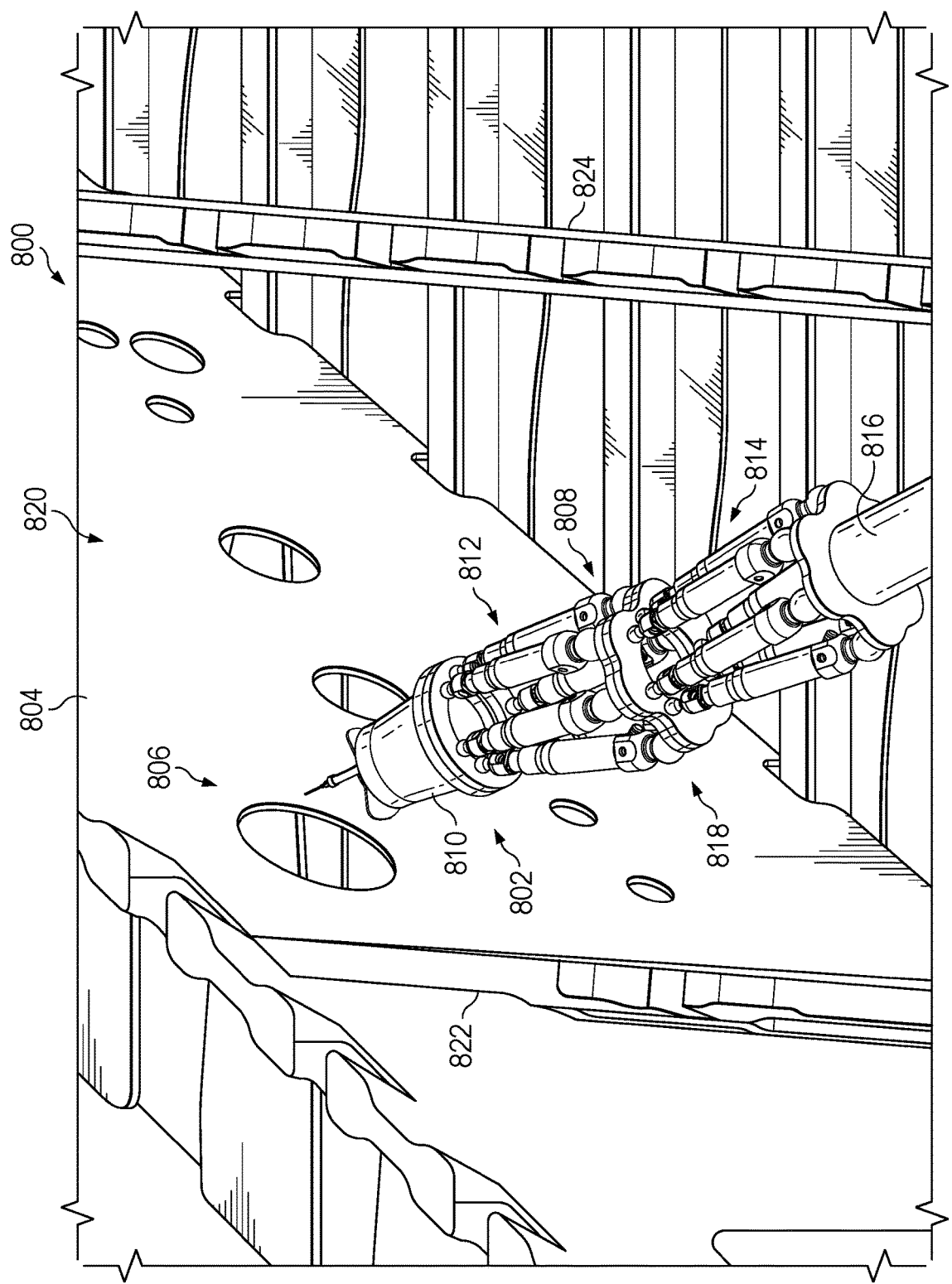
FIG. 8 is an illustration of an isometric view of an end effector within a confined space of a structure in accordance with an illustrative embodiment.

Turning now to FIG. 8 is an illustration of an isometric view of an end effector within a confined space of a structure is depicted in accordance with an illustrative embodiment. In view 800, end effector 802 is positioned to perform manufacturing operations on structure 804. In this illustrative example, end effector 802 is configured to apply sealant to opening 806 in structure 804. In this illustrative example, end effector 802 comprises pair of kinematic machines 808 and operational head 810. Pair of kinematic machines 808 comprises first kinematic machine 812 connected to second kinematic machine 814 in series. Second kinematic machine 814 is connected to robot 816.

As depicted, end effector 802 is in macro position 818. Macro position 818 is a position within confined space 820 such that movements by end effector 802 can be used to perform a number of manufacturing operations. Confined space 820 is partially defined by stiffener 822 and stiffener 824. Movements of pair of kinematic machines 808 provide movements of operational head 810 six degrees of freedom. Movements of pair of kinematic machines 808 provide for greater flexibility of movement than using robot 816. Movements of pair of kinematic machines 808 allow for movement within confined space 820 without undesirably affecting components of structure 804, such as stiffener 822 or stiffener 824.

Figure 9:
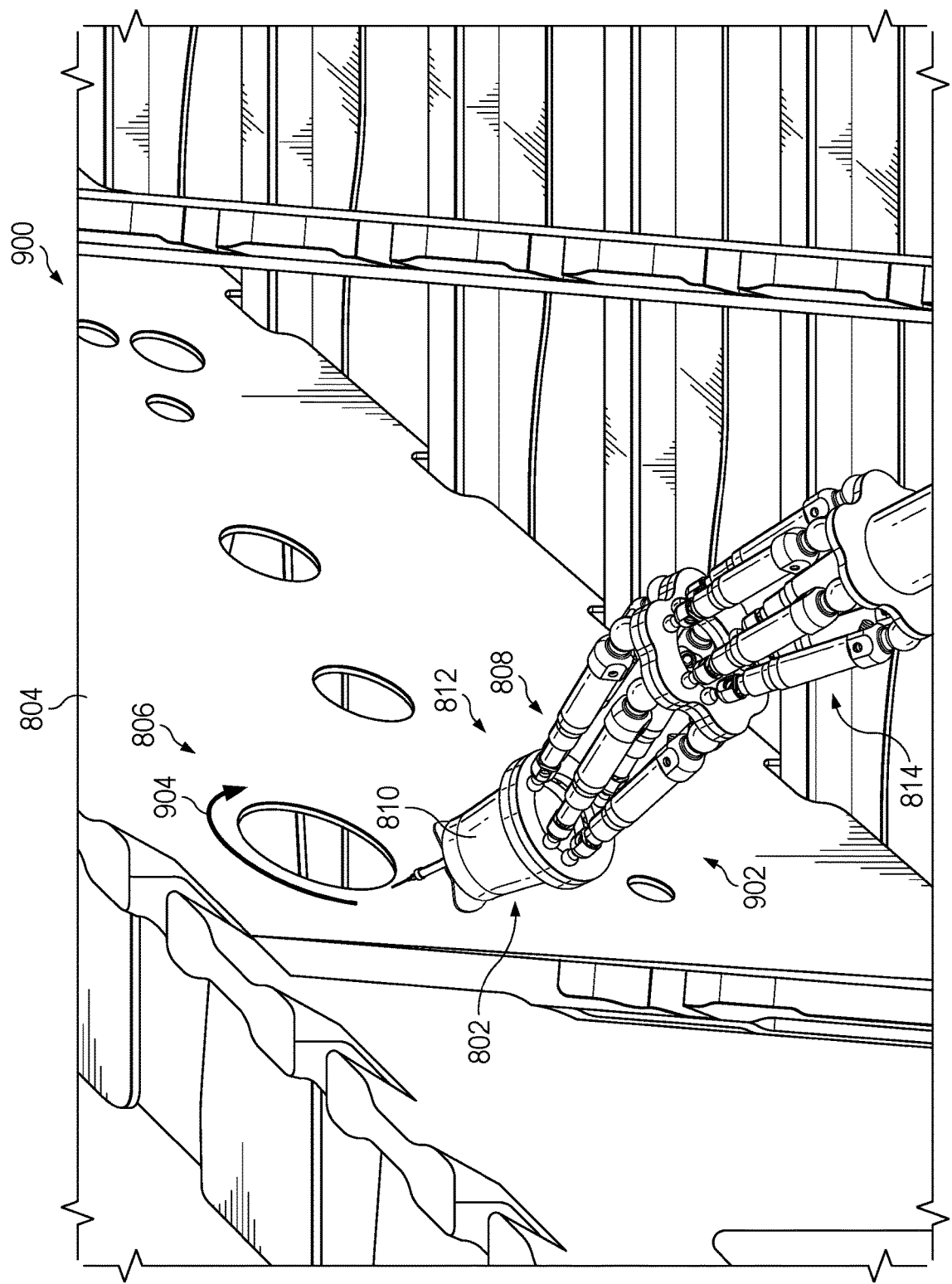
FIG. 9 is an illustration of an isometric view of an end effector within a confined space of a structure in accordance with an illustrative embodiment.

Turning now to FIG. 9 is an illustration of an isometric view of an end effector within a confined space of a structure is depicted in accordance with an illustrative embodiment. In view 900 end effector 802 has been moved to operational position 902. In operational position 902, operational head 810 can perform a number of manufacturing operations on structure 804. In view 900, at least one of first kinematic machine 812 or second kinematic machine 814 of pair of kinematic machines 808 of end effector 802 has been actuated to move operational head 810 to operational position 902. End effector 802 is in a position to move in operational path 904 relative to structure 804.

Figure 10:
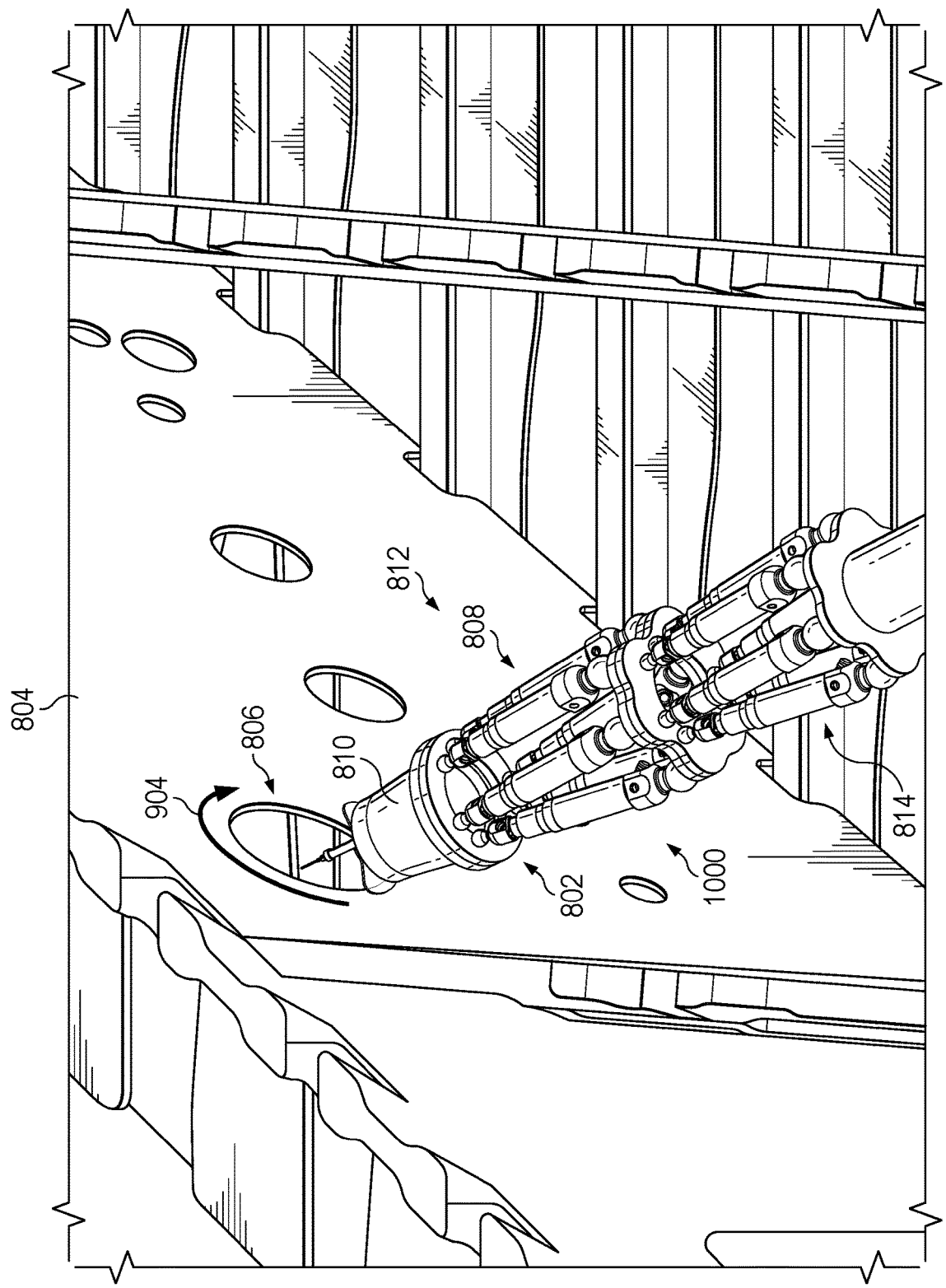
FIG. 10 is an illustration of an isometric view of an end effector within a confined space of a structure in accordance with an illustrative embodiment.
Figure 11:
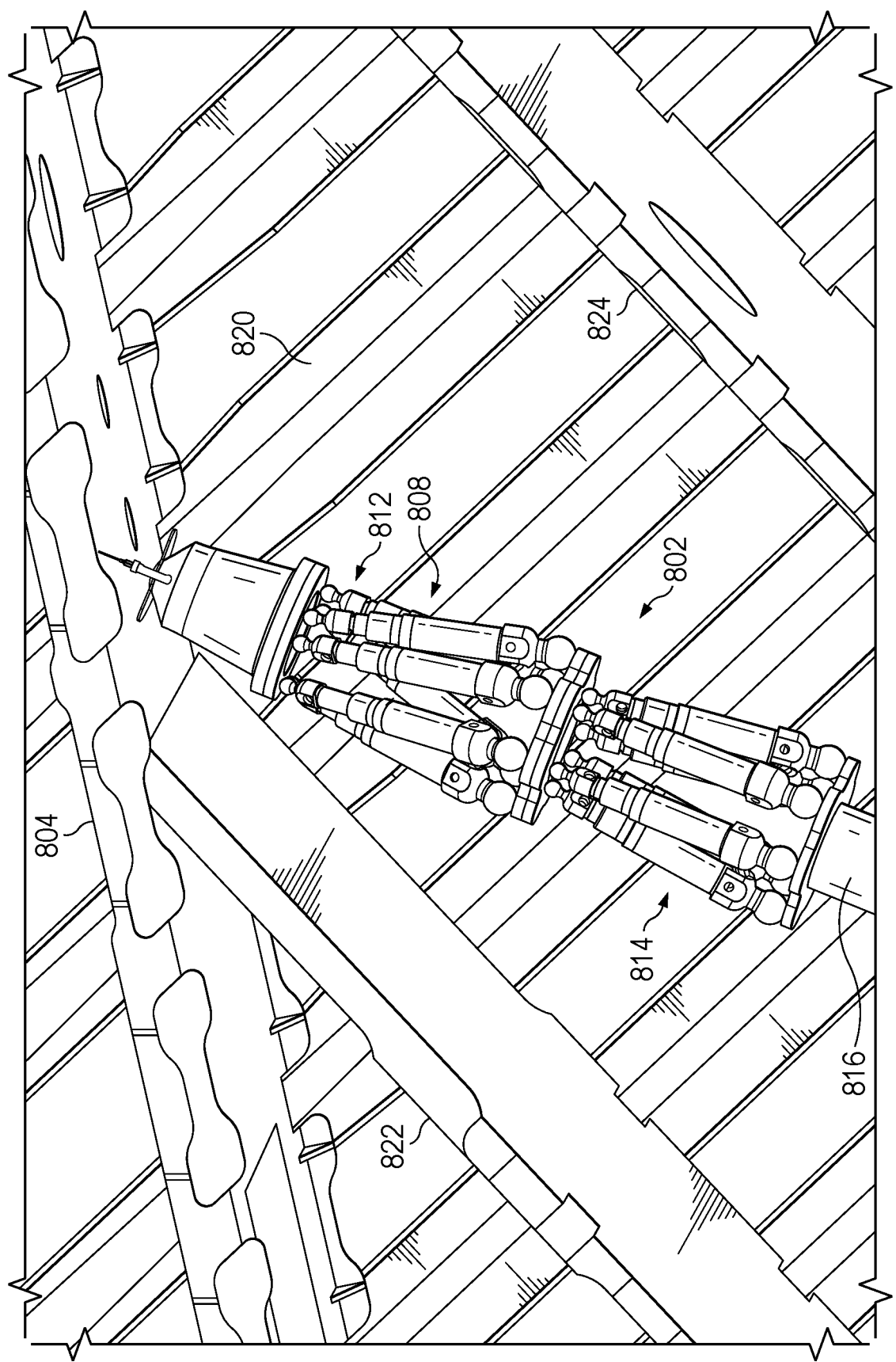
FIG. 11 is an illustration of a top view of an end effector moving within a confined space of a structure in accordance with an illustrative embodiment.
Figure 12:
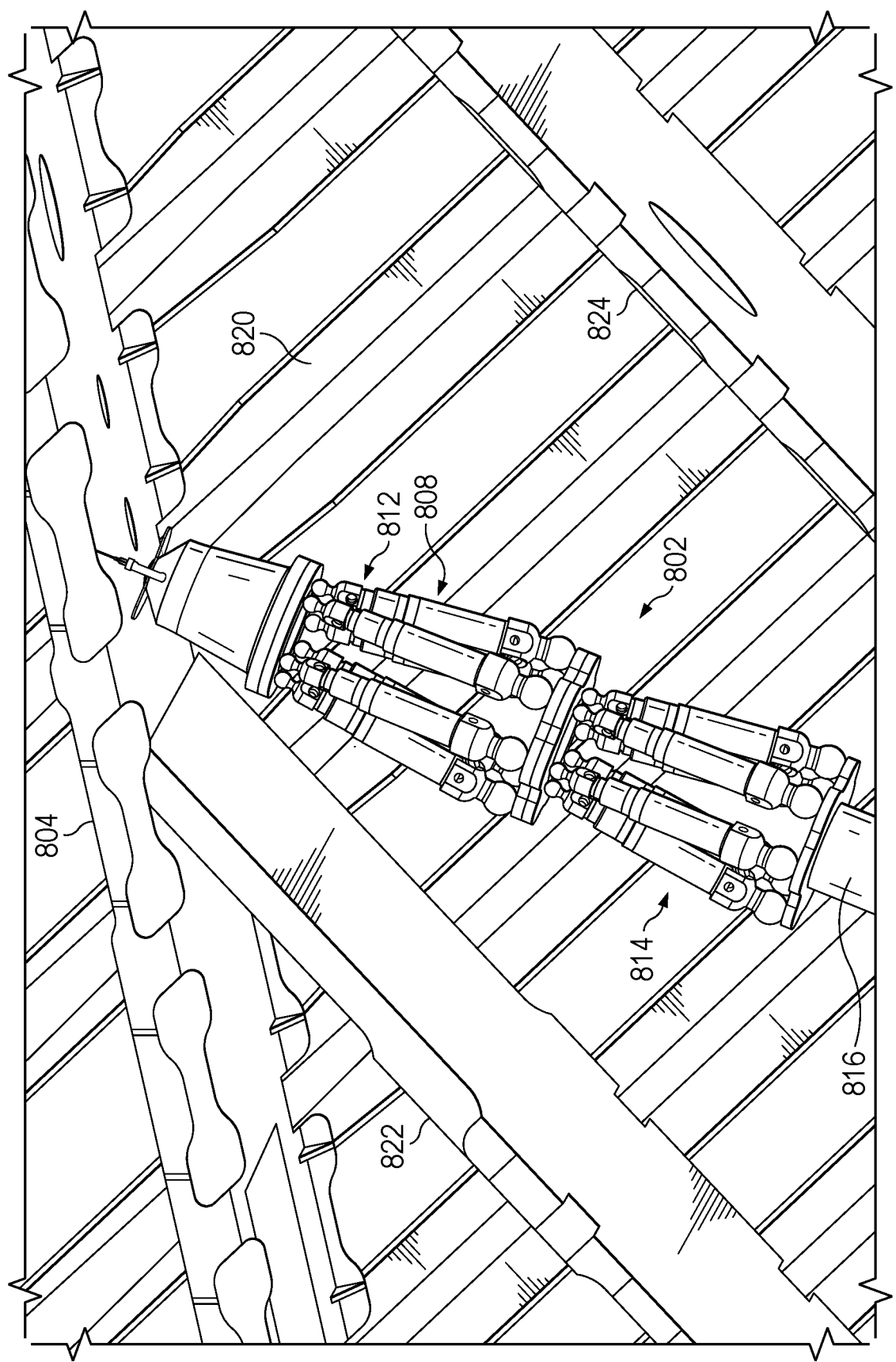
FIG. 12 is an illustration of a top view of an end effector moving within a confined space of a structure in accordance with an illustrative embodiment.
Figure 13:
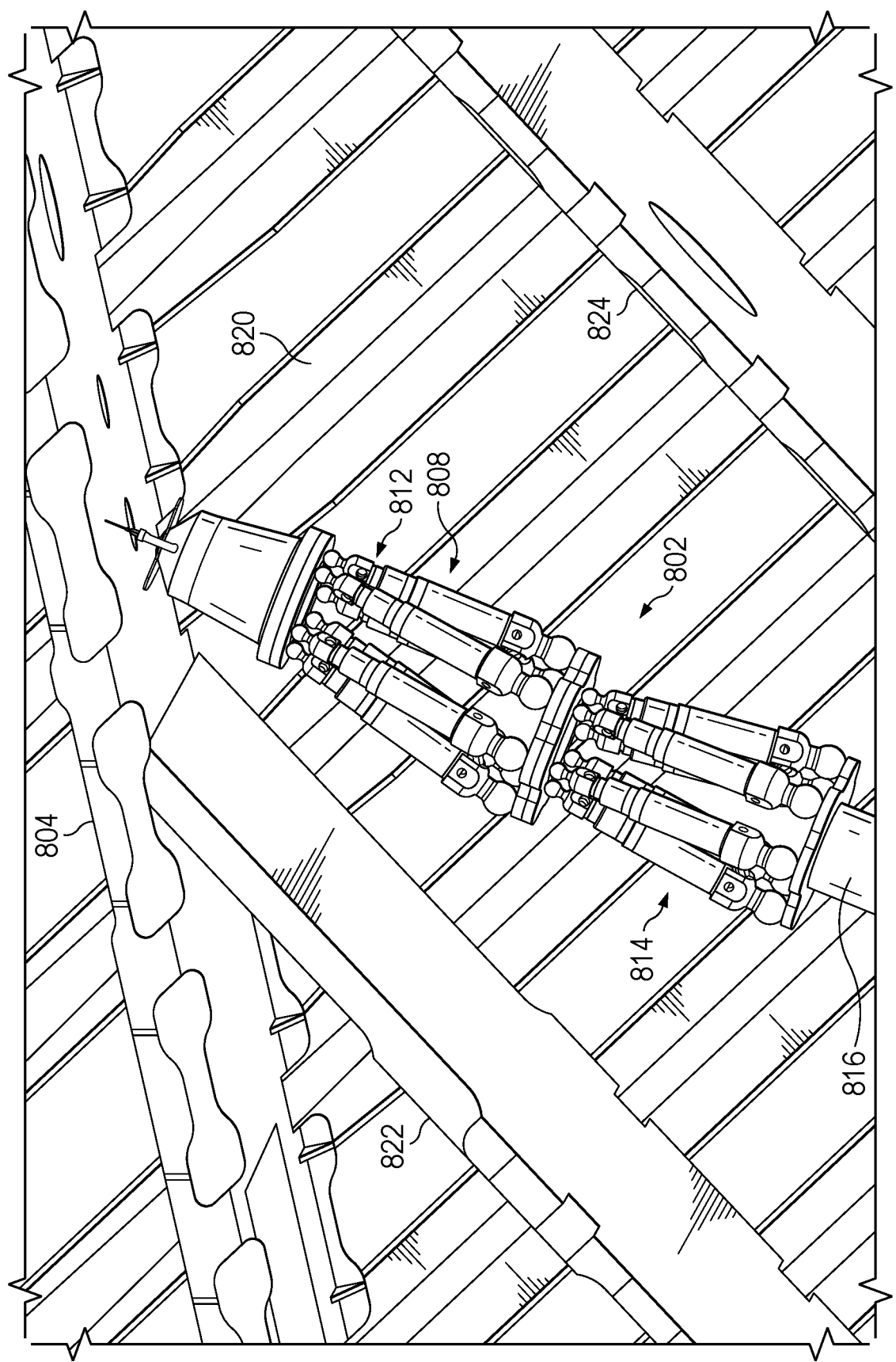
FIG. 13 is an illustration of a top view of an end effector moving within a confined space of a structure in accordance with an illustrative embodiment.
Figure 14:
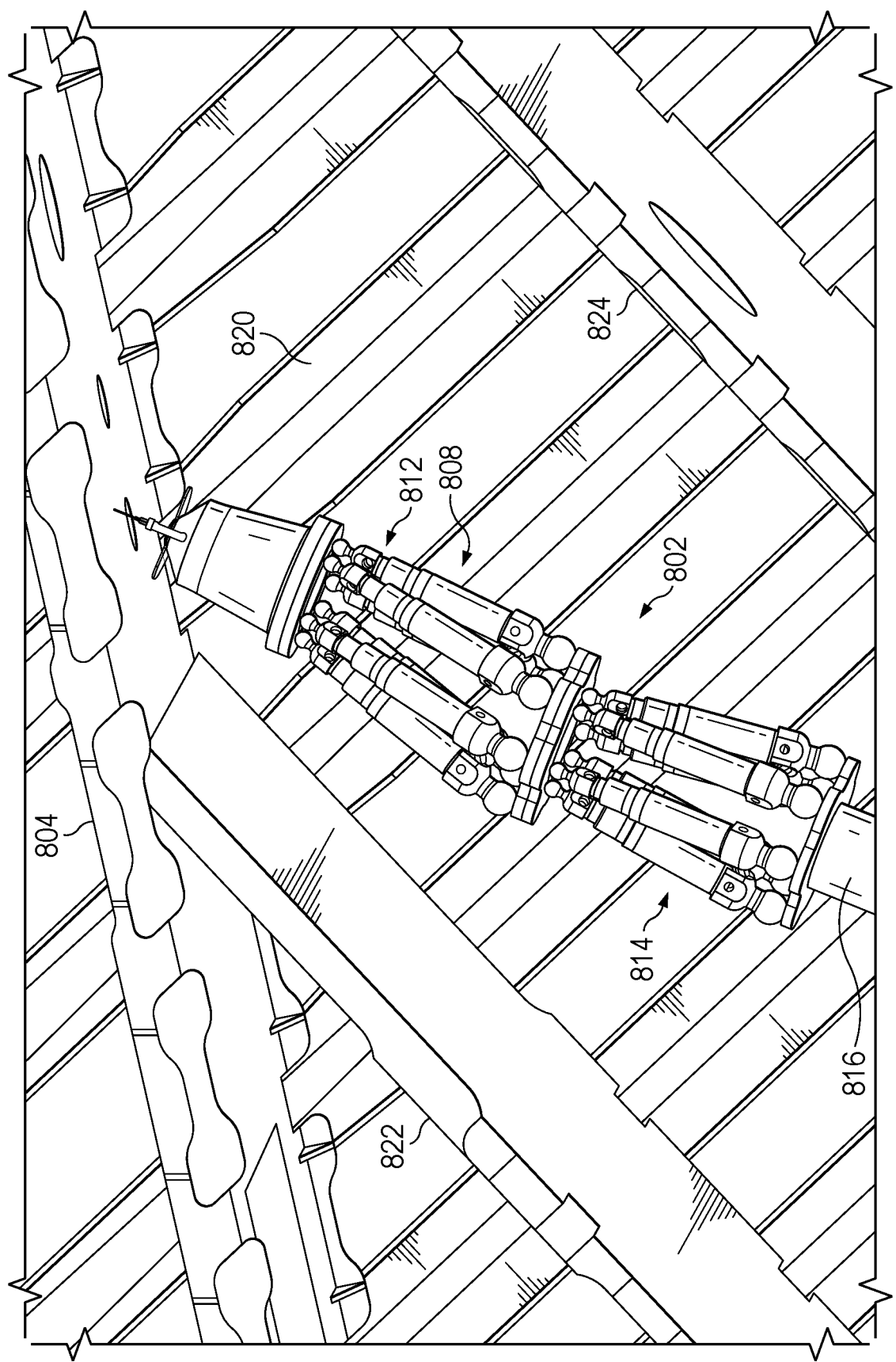
FIG. 14 is an illustration of a top view of an end effector moving within a confined space of a structure in accordance with an illustrative embodiment.

Turning now to FIG. 10 is an illustration of an isometric view of an end effector within a confined space of a structure is depicted in accordance with an illustrative embodiment. In view 1000, at least one of first kinematic machine 812 or second kinematic machine 814 of pair of kinematic machines 808 of end effector 802 has been actuated to move operational head 810 in operational path 904 relative to structure 804.

Turning now to FIGS. 11-14 illustrations of a top view of an end effector moving within a confined space of a structure are depicted in accordance with an illustrative embodiment. In FIGS. 11-14, robot 816 remains stationary in confined space 820. In FIGS. 11-14, at least one kinematic machine of pair of kinematic machines 808 is actuated to move operational head 810 to perform manufacturing operations on structure 804.

Figure 15:
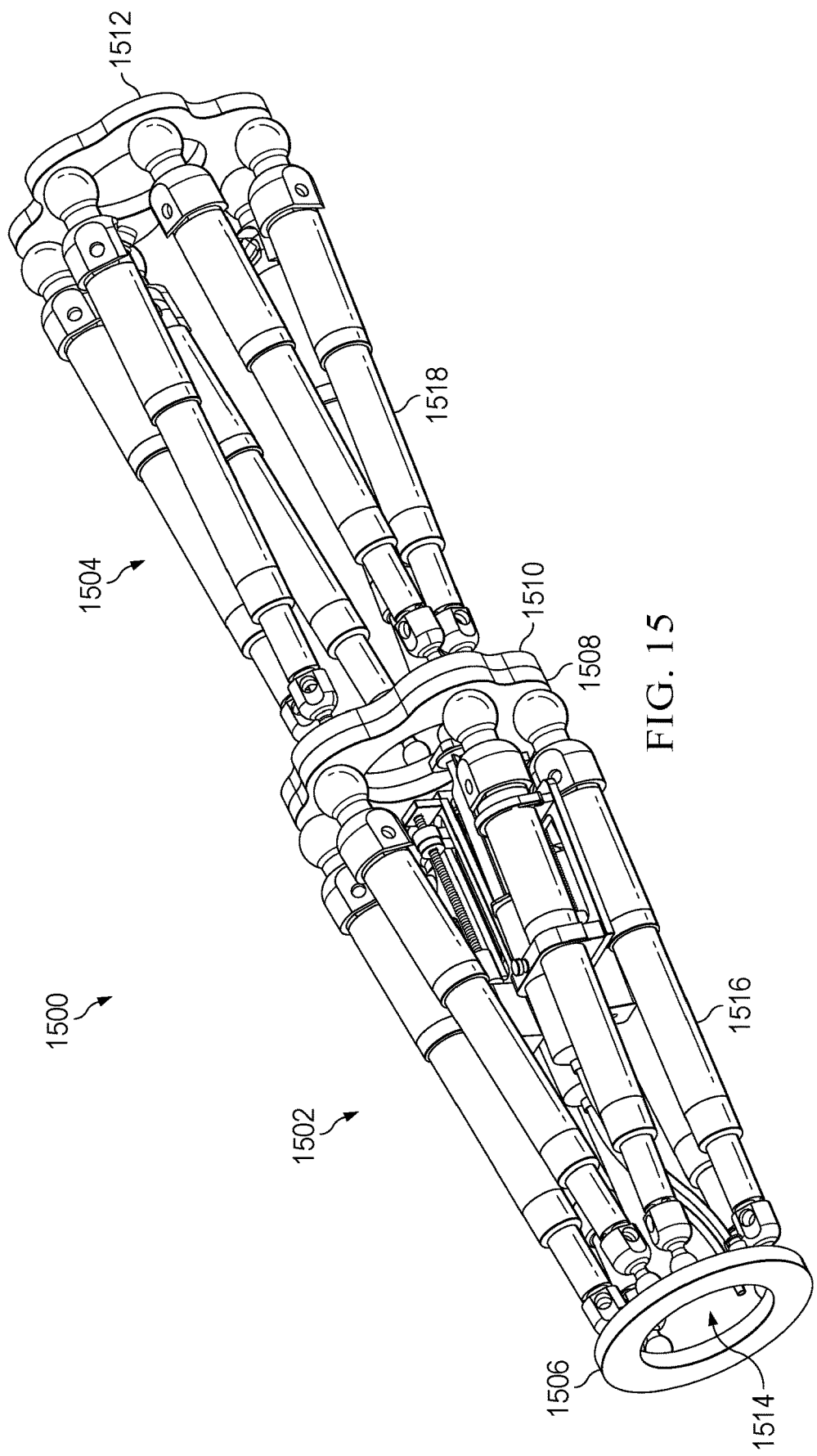
FIG. 15 is an illustration of an isometric view of a pair of kinematic machines of an end effector in accordance with an illustrative embodiment.

Turning now to FIG. 15 is an illustration of an isometric view of a pair of kinematic machines of an end effector is depicted in accordance with an illustrative embodiment. Pair of kinematic machines 1500 is a physical implementation of pair of kinematic machines 208 of FIG. 2. Pair of kinematic machines 1500 can be the same as pair of kinematic machines 302 of FIG. 3 or pair of kinematic machines 402 of FIG. 4. Pair of kinematic machines 1500 can be used with operational head 500 of FIGS. 5-6. In some illustrative examples, kinematic machine 700 can be one of pair of kinematic machines 1500. Pair of kinematic machines 1500 can be the same as pair of kinematic machines 808 of FIGS. 8-14.

Pair of kinematic machines 1500 comprises first kinematic machine 1502 and second kinematic machine 1504. First kinematic machine 1502 comprises first platform 1506 and first base 1508. Second kinematic machine 1504 comprises second platform 1510 and second base 1512. As depicted, each platform within pair of kinematic machines 1500 comprises an aperture. In this view, aperture 1514 in first platform 1506 is visible. Utilities for an operational head for an end effector can run through first kinematic machine 1502 and through aperture 1514 to the operational head (not depicted). Number of adjustable length structural members 1516 can be independently activated to move first platform 1506 in six degrees of freedom. Number of adjustable length structural members 1518 can be independently activated to move first platform 1506 in six degrees of freedom. In some illustrative examples, both number of adjustable length structural members 1516 and number of adjustable length structural members 1518 are independently actuated to move first platform 1506.

Figure 16:
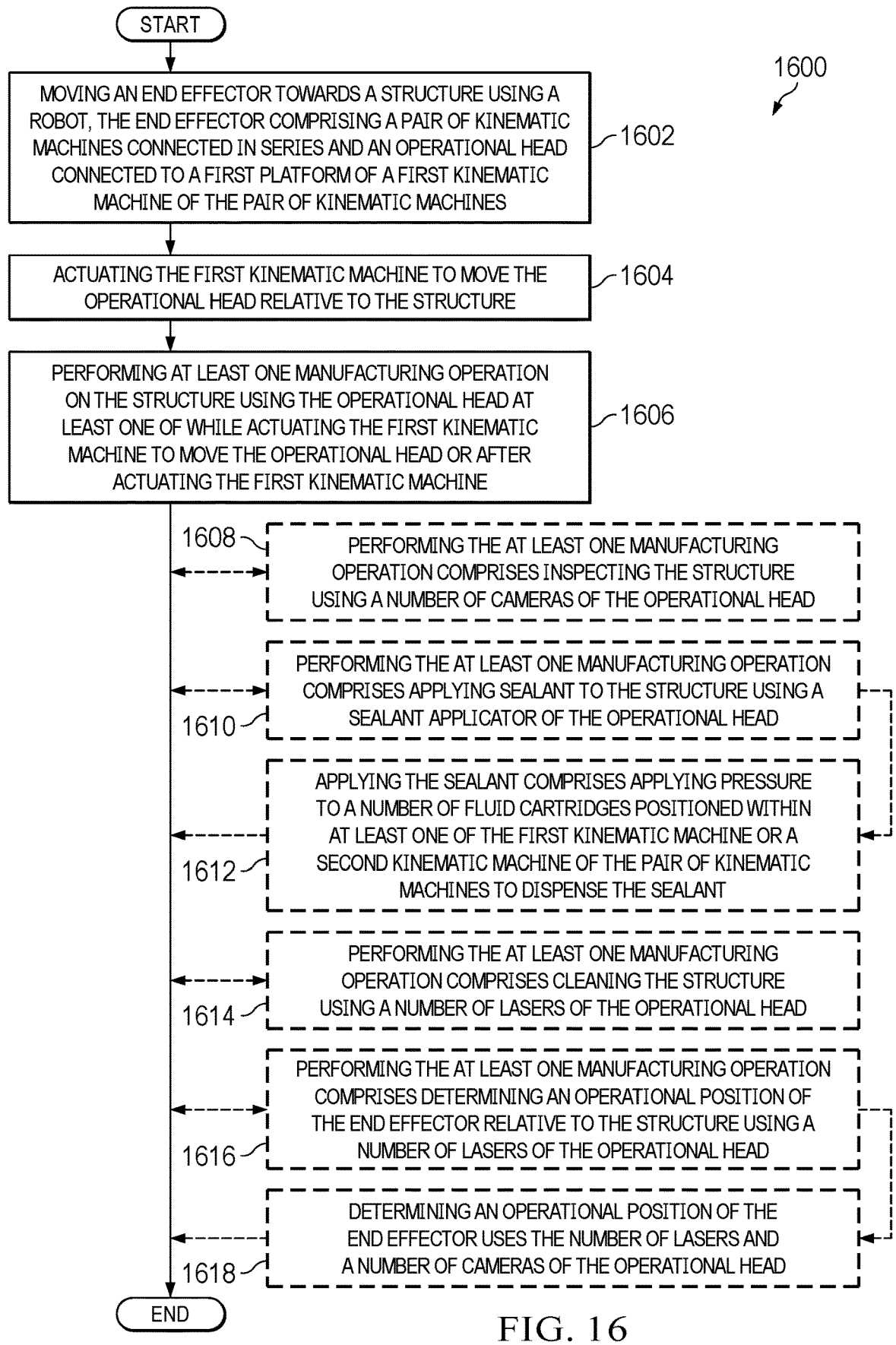
FIG. 16 is a flowchart of a method of using an end effector within a confined space in accordance with an illustrative embodiment.

Turning now to FIG. 16, a flowchart of a method of using an end effector within a confined space is depicted in accordance with an illustrative embodiment. In some illustrative examples, method 1600 can be used to perform manufacturing operations in a structure of aircraft 100. In some illustrative examples, method 1600 can be performed using end effector 200 of FIG. 2. In some illustrative examples, method 1600 can be performed using end effector 300 of FIG. 3. In some illustrative examples, method 1600 can be performed using end effector 400 of FIG. 4. In some illustrative examples, method 1600 can be performed using operational head 500 of FIGS. 5-6. In some illustrative examples, method 1600 can be performed using kinematic machine 700 of FIG. 7. In some illustrative examples, method 1600 can be performed using end effector 802 as illustrated in FIGS. 8-14. In some illustrative examples, method 1600 can be performed using pair of kinematic machines 1500 of FIG. 15.

Method 1600 moves an end effector towards a structure using a robot, the end effector comprising a pair of kinematic machines connected in series and an operational head connected to a first platform of a first kinematic machine of the pair of kinematic machines (operation 1602). In some illustrative examples, the robot moves the end effector to a macro position. Method 1600 actuates the first kinematic machine to move the operational head relative to the structure (operation 1604). Method 1600 performs a number of manufacturing operations on the structure using the operational head at least one of while actuating the first kinematic machine to move the operational head or after actuating the first kinematic machine (operation 1606). Afterwards, method 1600 terminates.

In some illustrative examples, performing the number of manufacturing operations comprises inspecting the structure using a number of cameras of the operational head (operation 1608). In some illustrative examples, performing the number of manufacturing operations comprises applying sealant to the structure using a sealant applicator of the operational head (operation 1610). In some illustrative examples, applying the sealant comprises applying pressure to a number of fluid cartridges positioned within at least one of the first kinematic machine or a second kinematic machine of the pair of kinematic machines to dispense the sealant (operation 1612).

In some illustrative examples, performing the number of manufacturing operations comprises cleaning the structure using a number of lasers of the operational head (operation 1614). In some illustrative examples, performing the number of manufacturing operations comprises determining an operational position of the end effector relative to the structure using a number of lasers of the operational head (operation 1616).

In some illustrative examples, determining an operational position of the end effector uses at least one of the number of lasers or a number of cameras of the operational head (operation 1618).

Figure 17:
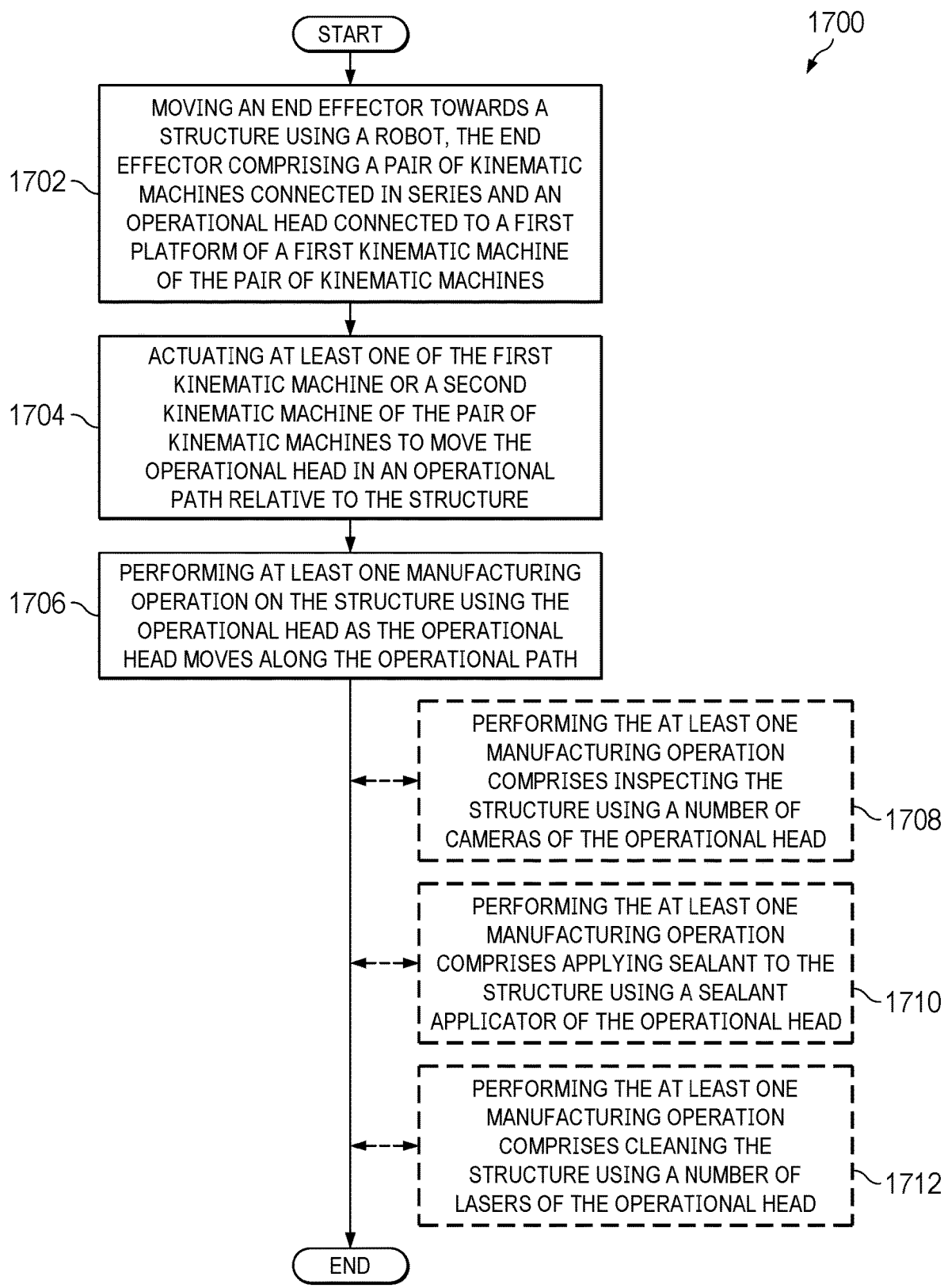
FIG. 17 is a flowchart of a method of using an end effector within a confined space in accordance with an illustrative embodiment.

Turning now to FIG. 17, a flowchart of a method of using an end effector within a confined space is depicted in accordance with an illustrative embodiment. In some illustrative examples, method 1700 can be used to perform manufacturing operations in a structure of aircraft 100. In some illustrative examples, method 1700 can be performed using end effector 200 of FIG. 2. In some illustrative examples, method 1700 can be performed using end effector 300 of FIG. 3. In some illustrative examples, method 1700 can be performed using end effector 400 of FIG. 4. In some illustrative examples, method 1700 can be performed using operational head 500 of FIGS. 5-6. In some illustrative examples, method 1700 can be performed using kinematic machine 700 of FIG. 7. In some illustrative examples, method 1700 can be performed using end effector 802 as illustrated in FIGS. 8-14. In some illustrative examples, method 1700 can be performed using pair of kinematic machines 1500 of FIG. 15.

Method 1700 moves an end effector towards a structure using a robot, the end effector comprising a pair of kinematic machines connected in series and an operational head connected to a first platform of a first kinematic machine of the pair of kinematic machines (operation 1702). Method 1700 actuates at least one of the first kinematic machine or a second kinematic machine of the pair of kinematic machines to move the operational head in an operational path relative to the structure (operation 1704). Method 1700 performs a number of manufacturing operations on the structure using the operational head as the operational head moves along the operational path (operation 1706). Afterwards, method 1700 terminates.

In some illustrative examples, method 1700 performs the number of manufacturing operations comprises inspecting the structure using a number of cameras of the operational head (operation 1708). In some illustrative examples, performing the number of manufacturing operations comprises applying sealant to the structure using a sealant applicator of the operational head (operation 1710). In some illustrative examples, performing the number of manufacturing operations comprises cleaning the structure using a number of lasers of the operational head (operation 1712).

Figure 18A:
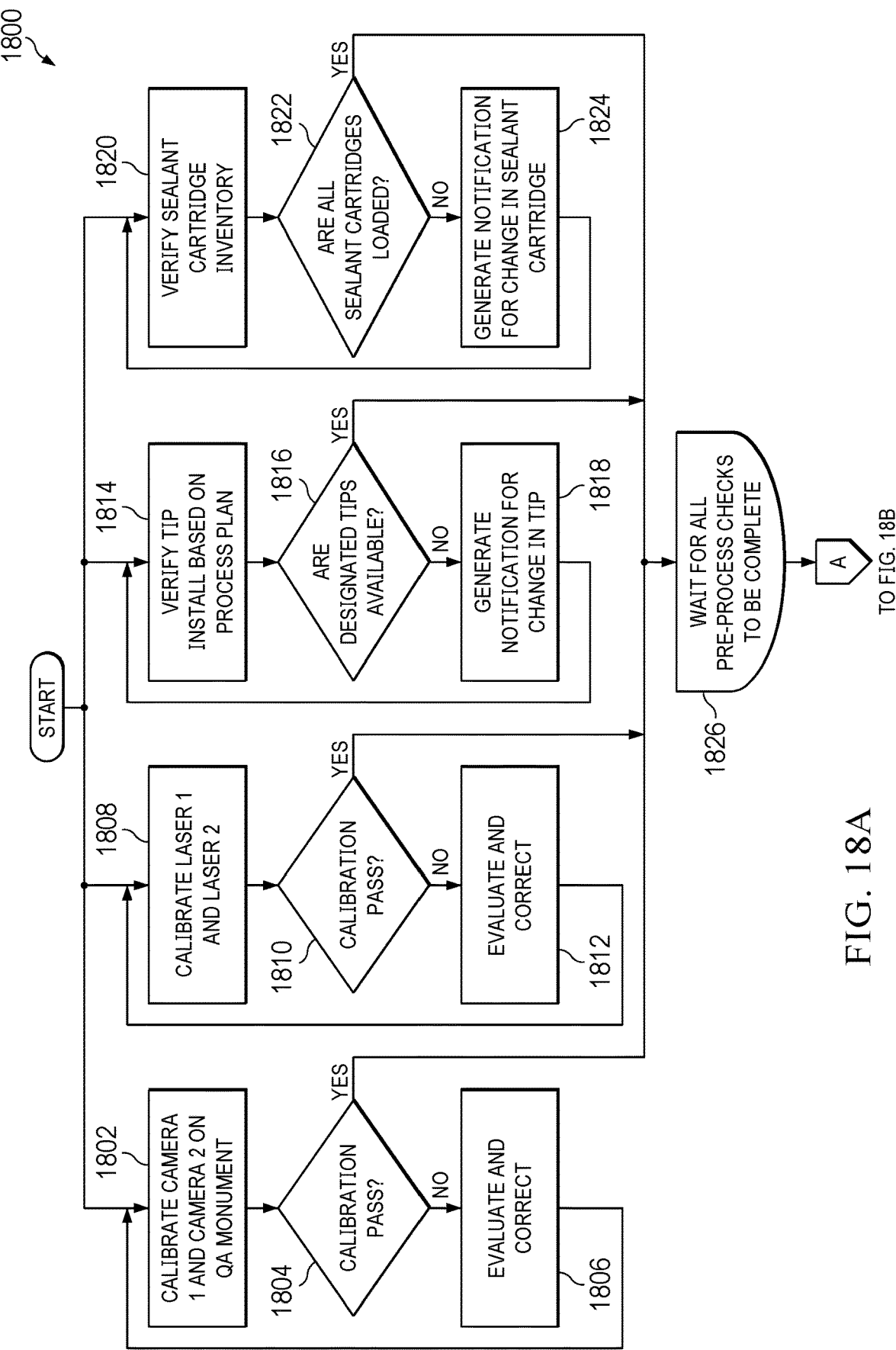
FIGS. 18A, 18B, and 18C are a flowchart of a method of using an end effector within a confined space in accordance with an illustrative embodiment.
Figure 18B:
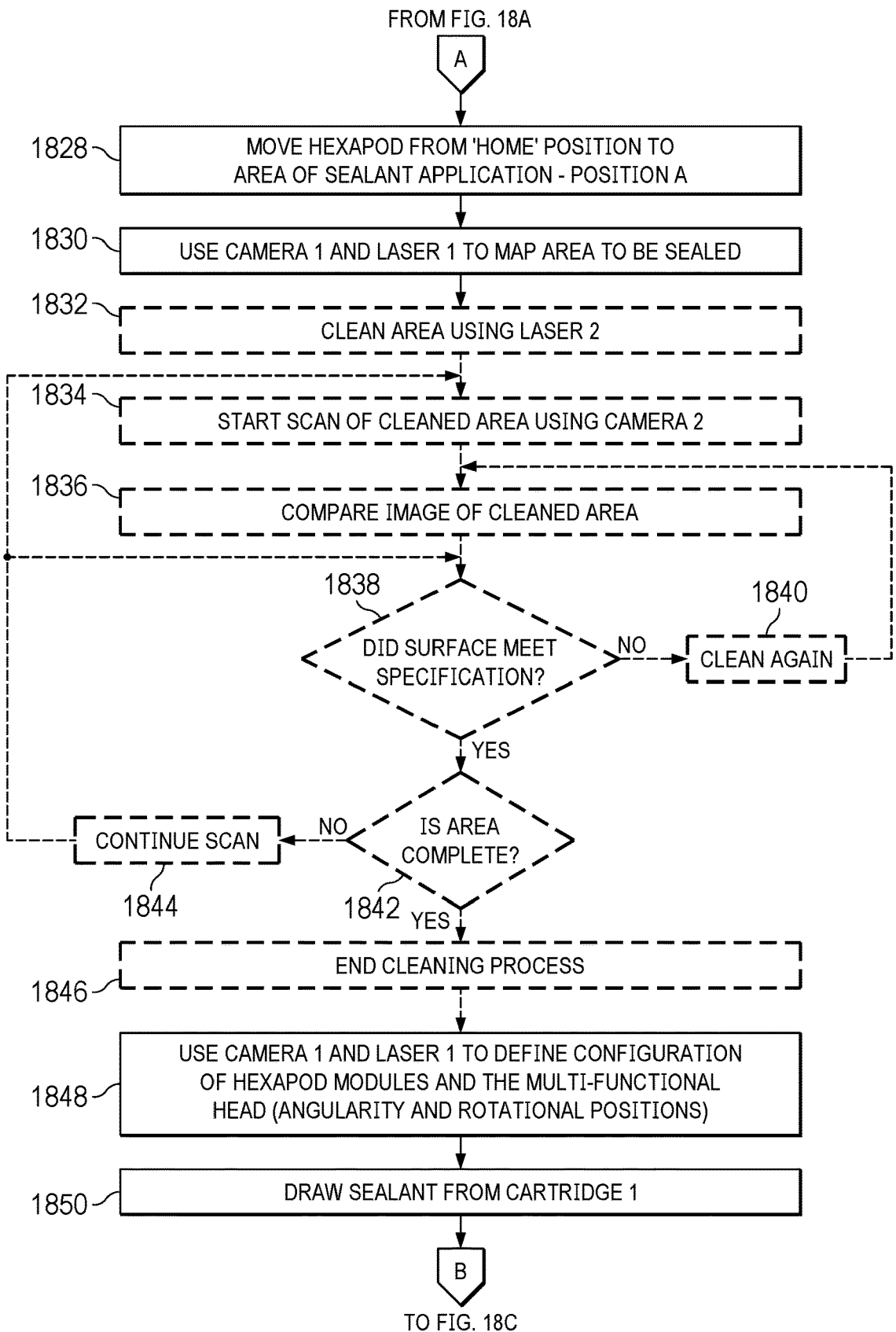
Figure 18C:
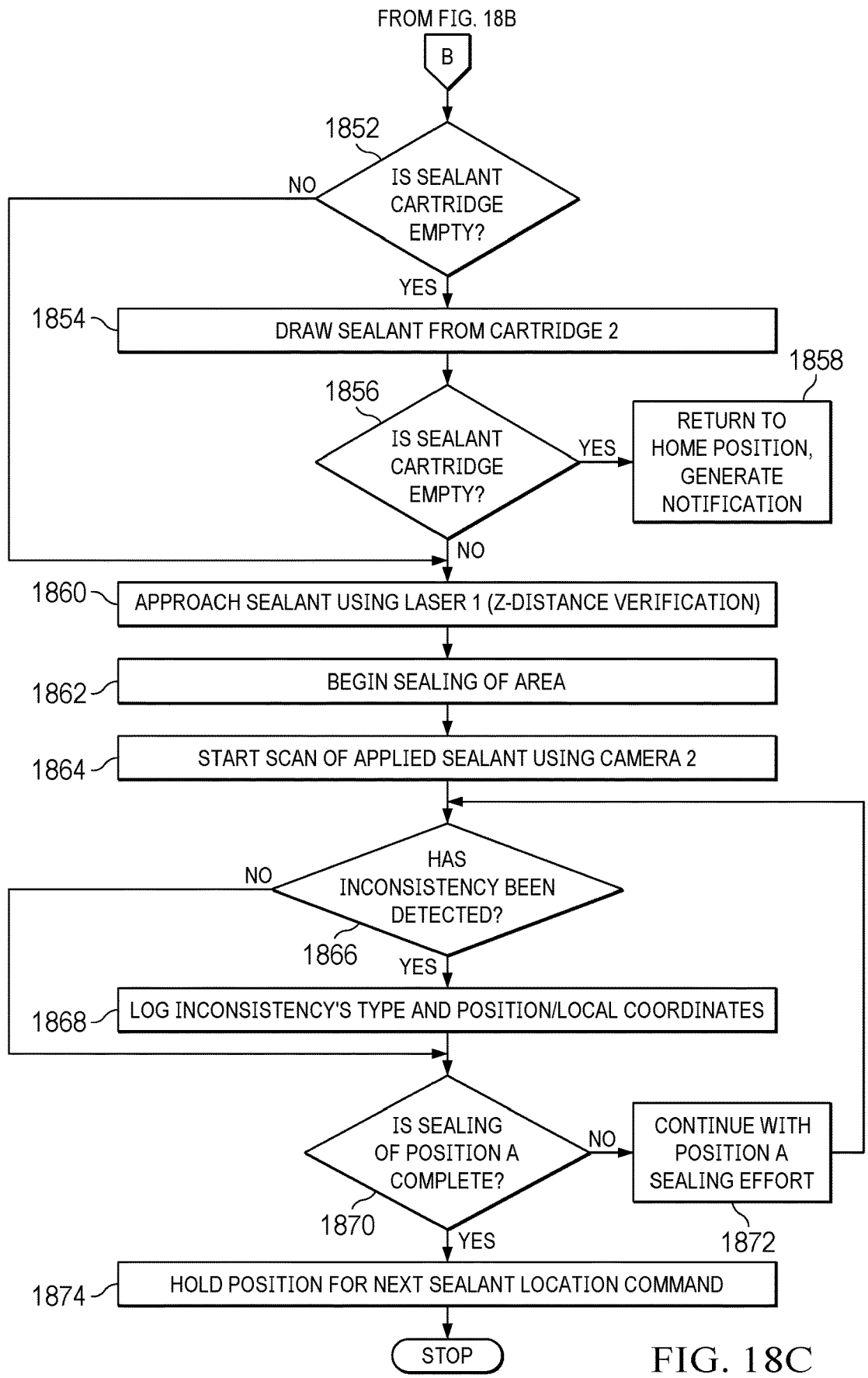

Turning now to FIGS. 18A, 18B, and 18C, a flowchart of a method of using an end effector within a confined space is depicted in accordance with an illustrative embodiment. In some illustrative examples, method 1800 can be used to perform manufacturing operations in a structure of aircraft 100. In some illustrative examples, method 1800 can be performed using end effector 200 of FIG. 2. In some illustrative examples, method 1800 can be performed using end effector 300 of FIG. 3. In some illustrative examples, method 1800 can be performed using end effector 400 of FIG. 4. In some illustrative examples, method 1800 can be performed using operational head 500 of FIGS. 5-6. In some illustrative examples, method 1800 can be performed using kinematic machine 700 of FIG. 7. In some illustrative examples, method 1800 can be performed using end effector 802 as illustrated in FIGS. 8-14. In some illustrative examples, method 1800 can be performed using pair of kinematic machines 1500 of FIG. 15.

Prior to performing manufacturing operations on a structure using an end effector, calibrations are performed. In operation 1802, a number of cameras are calibrated. In some illustrative examples, the end effector has two cameras. In these illustrative examples, in operation 1802, camera 1 and camera 2 are calibrated. If the calibration passes at operation 1804, additional calibrations and initializations of other components of the end effector are performed. In some illustrative examples, the controller waits for at least one of operation 1808, operation 1814, or operation 1820 to complete. If the calibration at 1802 does not pass at operation 1804, the calibration is evaluated and corrected at operation 1806.

Operation 1808 can be optional when a number of lasers is not present. In operation 1808, a number of lasers are calibrated. In some illustrative examples, the end effector has two lasers. In these illustrative examples, in operation 1808, laser 1 and laser 2 are calibrated. If the calibration passes at operation 1810, additional calibrations and initializations of other components of the end effector are performed. In some illustrative examples, the controller waits for at least one of operation 1802, operation 1814, or operation 1820 to complete. If the calibration at 1808 does not pass at operation 1810, the calibration is evaluated and corrected at operation 1812.

In operation 1814 presence of desired components of the operating head is verified. When a sealant applicator is present in the end effector, operation 1814 verifies that a designated tip is installs based on a process plan. If at decision 1816 the designated tips are available, the controller waits for other calibrations and verifications to complete for the structure. If at decision 1816 the designated tips are not available, a notification for a change in tip is generated at operation 1818.

In operation 1820, the sealant cartridge inventory is verified. At decision 1822, it is determined if all sealant cartridges are loaded. If at decision 1822 the sealant cartridges are not loaded, a notification for a change in sealant cartridge is generated at operation 1824.

After all calibrations and verifications are completed at operation 1826, method 1800 progresses to active steps for performing the manufacturing operation. In operation 1828, the end effector is moved from a home position to an area of sealant application—position A. Position A is an example of a location on the structure to receive a manufacturing operation. For example, position A can be a location relative to a hole to receive a sealant application.

In operation 1830 at least one of the number of cameras or the number of lasers is used to map the area to be sealed. In some illustrative examples, operation 1830 uses camera 1 and laser 1 to map area to be sealed. In some illustrative examples, the area is cleaned using laser 2 in operation 1832. In some illustrative examples, a scan of the cleaned area is performed using camera 2 in operation 1834. After the scan, the image of the cleaned area is compared in operation 1836 and it is determined in operation 1838 whether the surface meets a specification. If the surface does not meet the specification, the surface is cleaned again at operation 1840.

If the surface meets specification at operation 1838, it is determined if the area to be cleaned has been completed 1842. If the area has been completed at 1842, scanning is continued at operation 1844 and method 1800 repeats beginning at operation 1834. If the area has been completed 1842, the cleaning process ends at operation 1846. At operation 1848 a configuration for the pair of kinematic machines is determined. In operation 1848 camera 1 and laser 1 are used to define a configuration of the kinematic machines and the operational head (angularity and rotational positions). In operation 1850 sealant is drawn from a first cartridge of the number of cartridges. If the sealant cartridge is empty at operation 1852, sealant is drawn from the second cartridge at operation 1854. If the second sealant cartridge is determined to be empty at operation 1856, the end effector returns to a home position and a notification is generated at operation 1858.

If either cartridge is determined to not be empty at either operation 1852 or operation 1856, the operational head is moved to approach the structure with sealant using laser 1 in operation 1860. The first laser, laser 1 is a proximity sensor. In operation 1862 the end effector begins sealing the area. In this illustrative example, the applied sealant is scanned using camera 2 in operation 1864. In some illustrative examples, operation 1862 and operation 1864 are performed substantially simultaneously. In some illustrative examples, operation 1862 and operation 1864 are performed as the operational head moves along an operational path.

In operation 1866, a determination is made if an inconsistency has been detected. If an inconsistency is detected, the inconsistency's type and position/local coordinates are logged in operation 1868. After logging the inconsistency or if an inconsistency has not been detected, a determination is made if the sealing has been completed at position A in operation 1870. If sealing has not been completed for position A, sealing is continued in position A at operation 1872. If sealing at position A is complete at operation 1870, the position is held for a next sealant location command at operation 1874. For example, another hole or other location on structure can receive a sealant application after applying the sealant to the portion of structure at position A.

The initial steps show the calibration of the number of cameras and the number of lasers which are part of the multi-function operational head. Also included is a check to validate that the right application tip is being used for the particular type of sealant application (edge, fillet, brush coat or cap). The end effector is moved to the area where the sealant is to be applied. When present, the cleaning laser then cleans the area and the camera takes pictures which are then compared to clean standards. If the image is found to have met the quality of the clean standard the end effector then applies the sealant to the area of application using the applicator tip. During the sealant application process, the inspection camera is used in real time to check on the quality of the sealant application and any discrepancies are logged and documented to address any corrections needed.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1608 through operation 1618 may be optional. As another example, any of operation 1708 through operation 1712 may be optional. As another example, any of operation 1832 through operation 1846 may be optional.

The illustration of manufacturing environment 202 in FIG. 2, end effector 300 in FIG. 3, end effector 400 in FIG. 4, operational head 500 in FIGS. 5-6, kinematic machine 700 of FIG. 7, and end effector and confined area depictions in FIGS. 8-14 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

The different components shown in FIGS. 3-14 may be combined with components in FIG. 2, used with components in FIG. 2, or a combination of the two. Additionally, some of the components in FIGS. 3-14 may be illustrative examples of how components shown in block form in FIG. 2 may be implemented as physical structures.

Figure 19:
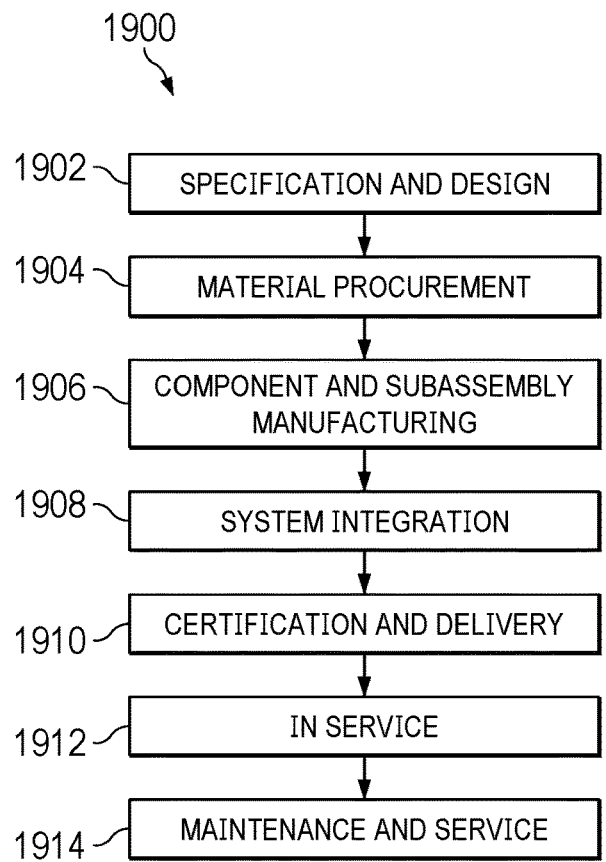
FIG. 19 is an illustration of an aircraft manufacturing and service method in a form of a block diagram in accordance with an illustrative embodiment.
Figure 20:
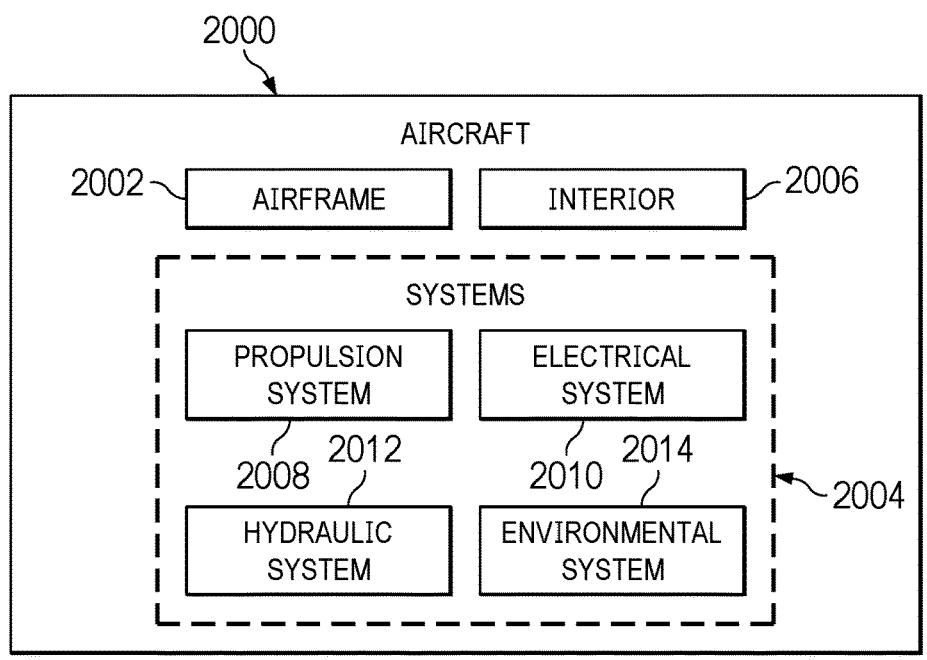
FIG. 20 is an illustration of an aircraft in a form of a block diagram in which an illustrative embodiment may be implemented.

Illustrative embodiments of the present disclosure may be described in the context of aircraft manufacturing and service method 1900 as shown in FIG. 19 and aircraft 2000 as shown in FIG. 20. Turning first to FIG. 19, an illustration of an aircraft manufacturing and service method in a form of a block diagram is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, or other maintenance and service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft in a form of a block diagram is depicted in which an illustrative embodiment may be implemented. In this example, aircraft 2000 is produced by aircraft manufacturing and service method 1900 of FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included.

Apparatuses and methods embodied herein may be employed during at least one of the stages of aircraft manufacturing and service method 1900. One or more illustrative embodiments may be manufactured or used during at least one of component and subassembly manufacturing 1906, system integration 1908, in service 1912, or maintenance and service 1914 of FIG. 19.

A portion of airframe 2002 of aircraft 2000 can be formed by method 1600, method 1700, or method 1800. At least one of method 1600, method 1700, or method 1800 can be performed during component and subassembly manufacturing 1906. End effector 200 can be used to perform manufacturing operations during component and subassembly manufacturing 1906. A structure worked upon by end effector 200 is present and utilized during in service 1912. At least one of method 1600, method 1700, or method 1800 can be performed during maintenance and service 1914 to perform maintenance or to form a replacement part.

The illustrative examples provide an end effector configured to perform a number of manufacturing operations on a structure within a confined space. In some illustrative examples, the operational head of the end effector is configured to apply sealant to the structure. In some illustrative examples, a sealing end effector to be used for confined space IML robotic sealing applications is presented. In some illustrative examples, the end effector comprises multiple hexapods arranged in series to pass through access holes. In some illustrative examples, the hexapods are of a width configured to fit through access holes. In some illustrative examples, the end effector can fit through wing holes in aircraft manufacturing.

The kinematic machines have modular adjustable length members with ball and socket joint connected ends which provide six degrees of freedom. This modularity also allows for adaptable lengths. The operational head (nose piece) is on a turntable relative to the kinematic machines. In some illustrative examples, operational head has a positional locating camera, a 2nd seal inspection camera, a positional locating laser, a pre-application clean/drying laser and an exchangeable sealant application tip. The end effector provides longitudinal rotational capability of the multi-function head. The end effector provides multiple fluid cartridge carrying capability for continuous application. In some illustrative examples, the operational head is a multi-function head assembly incorporating the functions of cleaning, sealing, and inspection. The end effector utilizes NC control and a camera feedback control loop.

The illustrative examples provide a compact multi-function end effector. In some illustrative examples, the end effector enables a robot to clean, seal and inspect in the inside of confined spaces of structures. In some illustrative examples, the end effector can be used within confined spaces of aircraft structures.

The end effector comprises a modular multi-section design with each section containing adjustable length structural members. The adjustable length structural members are connected to base plates using swivel ball and socket joints providing six degrees of freedom. In some illustrative examples, the multi-function operational head has sealant applicator tips for sealing, two vision systems for positional referencing and for inspection, a laser system for surface cleaning, a laser scanner for contour and surface mapping integrated into a single head assembly of the multi-function end effector.

The end effector is moved and/or shaped in six degrees of freedom through confined space to a manufacturing operation locale using the locating camera and/or laser. In some illustrative examples, the manufacturing operation locale is a sealant application locale. In some illustrative examples, a cleaning laser is present in the operational head. In these illustrative examples, the cleaning laser then cleans the application area and an inspection camera generates images which are compared to clean standards. When clean standards are met, the end effector then applies the sealant to the application area with an applicator tip. The inspection camera is used in real time to monitor and record sealant application quality and laser cleaning of sealant.

In some illustrative examples, the operational head is a multi-function head. In some illustrative examples, the multi-function head has a positional camera to position the end effector at the area of seal application. In some illustrative examples, the multi-function head has a second camera to be used for inspection of the applied seal. In some illustrative examples, the multi-function head has a laser to help in the positioning of the end effector at the area of seal application. In some illustrative examples, the multi-function head has a second laser to clean the area of seal application. In some illustrative examples, the multi-function head has an application tip for applying the seal to structure or fastener.

In some illustrative examples, the adjustable structural length members operate electrically to move in and out for achieving the change in length and thus angular variation of the platform. In some illustrative examples, both sides have a ball and socket joint. In other illustrative examples, at one end of the member, a ball joint is used while the other end there is a ball and socket joint. These flexible joints coupled with the translational adjustable lengths of the structural members provide the end effector angular movement capabilities resulting in the six degrees of freedom.

A rotation plate is used to provide rotational movement of the head. The illustrative examples can carry multiple fluid cartridges. In some illustrative examples, the carrying capability of the end effector is two or three fluid cartridges. In some illustrative examples, the fluid cartridges are attached to the adjustable structural members and have dispensing screw mechanisms that are mechanically operated.

The illustrative examples provide robotic sealing in confined space applications. The robotic sealing end effector can be used instead of operators. In some illustrative examples, using the robotic sealing end effector can reduce or eliminate ergonomic challenges associated with confined space manufacturing processes.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An end effector for manufacturing operations comprising:
a first kinematic machine and a second kinematic machine connected in series, the first and second kinematic machines each includes a number of adjustable length structural members;
a head connected to a first platform of the first kinematic machine, the head configured to perform manufacturing operations on a structure; and
a number of fluid cartridges positioned within at least one of the first kinematic machine or the second kinematic machine.

2. The end effector of claim 1, wherein the first and second kinematic machines comprise at least one hexapod.

3. The end effector of claim 1 further comprising:
a rotational joint between the head and the first platform of the first kinematic machine.

4. The end effector of claim 1, wherein the head comprises:
a sealant applicator.

5. The end effector of claim 1, wherein the head comprises:
a number of cameras.

6. The end effector of claim 5, wherein the head comprises:
a splash shield configured to reduce debris contacting the number of cameras as the head performs the manufacturing operations on the structure.

7. The end effector of claim 1, wherein the head comprises:
a number of lasers.

8. The end effector of claim 1, wherein the first and second kinematic machines each comprise:
a respective platform;
a respective base; and
the number of adjustable length structural members movably connected to both the respective platform and the respective base.

9. The end effector of claim 8, wherein the respective platform of each kinematic machine comprises an aperture.

10. The end effector of claim 1, wherein one of the kinematic machines is connected to a robot.

11. An end effector for manufacturing operations, comprising:
a first kinematic machine and a second kinematic machine connected in series, the first and second kinematic machines each include a number of adjustable length structural members; and
a head including a sealant applicator connected to a first platform of the first kinematic machine, the head configured to perform number of manufacturing operations on a structure,
a number of fluid cartridges positioned within at least one of the first kinematic machine or the second kinematic machine; and
a rotational joint between the head and the first platform of the first kinematic machine.

12. The end effector of claim 11, wherein the first and second kinematic machines comprise at least one hexapod.

13. The end effector of claim 11, wherein the head comprises a number of cameras.

14. The end effector of claim 13, wherein the cameras are directed away from the first and second kinematic machines.

15. The end effector of claim 11, wherein the head comprises a splash shield configured to reduce debris contacting the number of cameras as the head performs the manufacturing operations on the structure.

16. The end effector of claim 11, wherein the head comprises a number of lasers.

17. The end effector of claim 16, wherein the number of lasers comprise proximity sensors.

18. The end effector of claim 11, wherein the first and second kinematic machines each comprise:
   a respective platform;
   a respective base; and
   the number of adjustable length structural members movably connected to both the respective platform and the respective base.

19. The end effector of claim 11, wherein the respective platform of each kinematic machine comprises an aperture.

20. The end effector of claim 11, wherein one of the kinematic machines is connected to a robot.

\* \* \* \* \*